US011617080B2

(12) United States Patent
Singh

(10) Patent No.: US 11,617,080 B2
(45) Date of Patent: Mar. 28, 2023

(54) DEVICE AUTHENTICATION SYSTEM AND METHOD

(71) Applicant: Avinash Vijai Singh, Manorhaven, NY (US)

(72) Inventor: Avinash Vijai Singh, Manorhaven, NY (US)

( * ) Notice: Subject to any disclaimer, the term of this patent is extended or adjusted under 35 U.S.C. 154(b) by 262 days.

(21) Appl. No.: 16/716,914

(22) Filed: Dec. 17, 2019

(65) Prior Publication Data

US 2020/0204993 A1 Jun. 25, 2020

Related U.S. Application Data

(63) Continuation-in-part of application No. 16/013,905, filed on Jun. 20, 2018, now abandoned, which is a
(Continued)

(51) Int. Cl.
*H04W 12/06* (2021.01)
*H04L 9/40* (2022.01)
(Continued)

(52) U.S. Cl.
CPC .......... *H04W 12/06* (2013.01); *G06F 21/305* (2013.01); *G06V 40/12* (2022.01); *G06V 40/18* (2022.01);
(Continued)

(58) Field of Classification Search
CPC ... H04L 63/083; H04L 63/0861; G06V 40/12; G06V 40/18; H04M 1/72463; G06F 21/305; H04W 12/06
See application file for complete search history.

(56) References Cited

U.S. PATENT DOCUMENTS

2014/0172535 A1* 6/2014 Matthews .......... G06Q 30/0207
705/14.27
2015/0371253 A1* 12/2015 Hamilton, II ...... G06Q 30/0217
705/14.19
(Continued)

OTHER PUBLICATIONS

Richer et al, OAuth 2.0 Dynamic Client Registration Management (DCRM) Protocol; Jul. 2015 ,Internet Engineering Task Force (IETF) ITEF Trust pp. 6-11. (Year: 2015).*

*Primary Examiner* — Ashokkumar B Patel
*Assistant Examiner* — William B Jones
(74) *Attorney, Agent, or Firm* — Collard & Roe, P.C.

(57) ABSTRACT

There is a system for controlling access to an electronic device. This system can comprise at least one server having at least one microprocessor. There can be at least one remote device having at least one microprocessor, and at least one GPS location device, wherein the one remote device is configured to communicate a location of the at least one remote device. This remote device further comprises any one of at least one transceiver configured to communicate wirelessly, at least one biometric reader configured to read a biometric of a user and/or at least one hardware reader configured to read an identification piece. Thus, the electronic device is selectively unlocked via either an internal lock or via the server authenticating a location of the remote device, a Wifi signal of the remote device, a biometric reading of the remote device and a reading of the hardware reader of the remote device.

10 Claims, 29 Drawing Sheets

Related U.S. Application Data continuation of application No. 15/241,910, filed on Aug. 19, 2016, now abandoned, which is a continuation-in-part of application No. 14/569,403, filed on Dec. 12, 2014, now abandoned.

(60) Provisional application No. 62/864,679, filed on Jun. 21, 2019, provisional application No. 62/781,155, filed on Dec. 18, 2018, provisional application No. 62/350,652, filed on Jun. 15, 2016, provisional application No. 61/916,766, filed on Dec. 16, 2013.

(51) Int. Cl.
  | | |
  |---|---|
  | *G06F 21/30* | (2013.01) |
  | *H04M 1/72463* | (2021.01) |
  | *G06V 40/12* | (2022.01) |
  | *G06V 40/18* | (2022.01) |
  | *H04W 12/30* | (2021.01) |
  | *H04W 12/63* | (2021.01) |

(52) U.S. Cl.
  CPC ........ *H04L 63/083* (2013.01); *H04L 63/0861* (2013.01); *H04M 1/72463* (2021.01); *H04W 12/30* (2021.01); *H04W 12/63* (2021.01)

(56) References Cited

U.S. PATENT DOCUMENTS

| | | | |
|---|---|---|---|
| 2017/0123599 A1* | 5/2017 | Jones-McFadden | .... G06F 21/44 |
| 2018/0248902 A1* | 8/2018 | Dănilă-Dumitrescu | ..................... H04L 67/535 |
| 2021/0308522 A1* | 10/2021 | Booher | ................. G16H 20/30 |

* cited by examiner

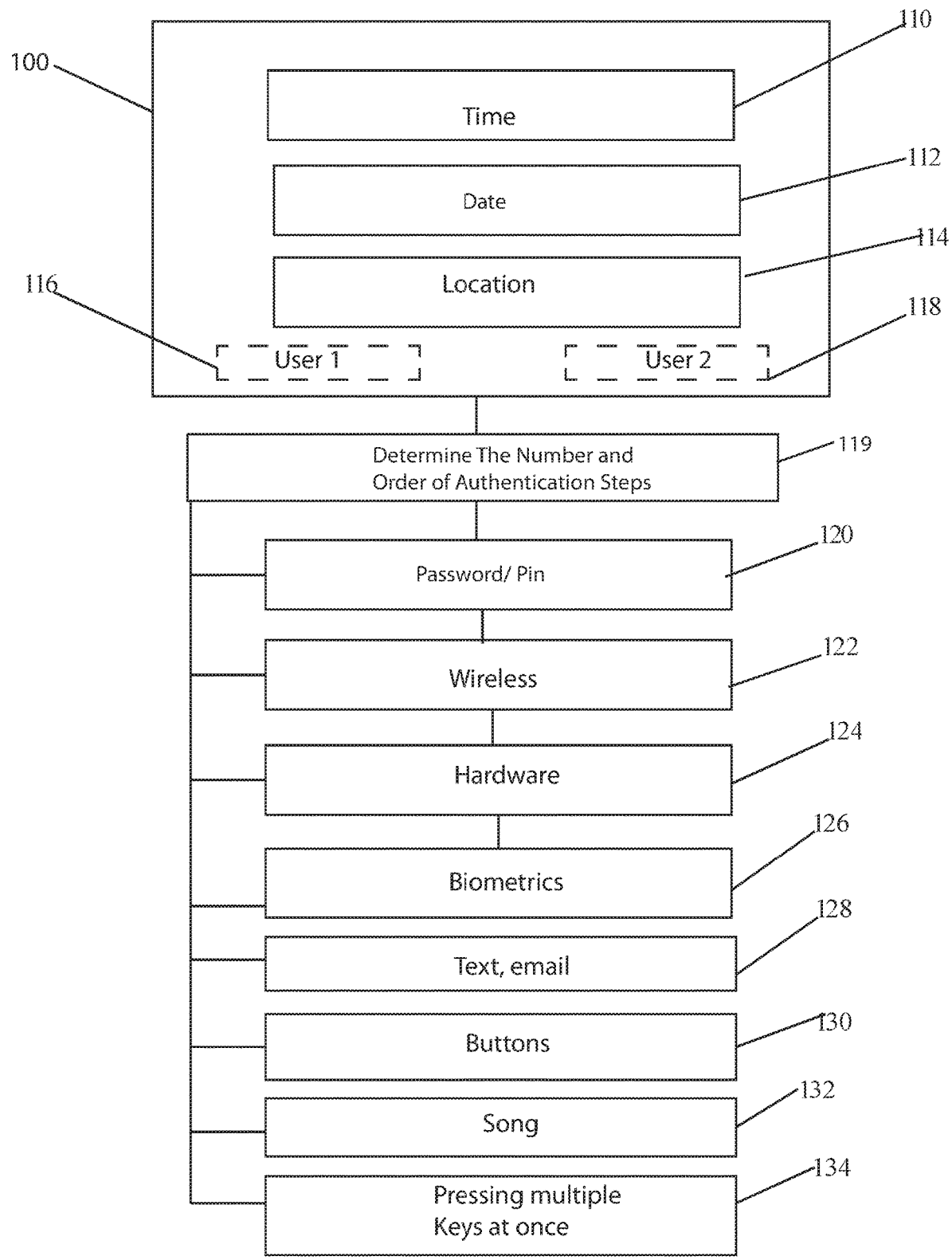

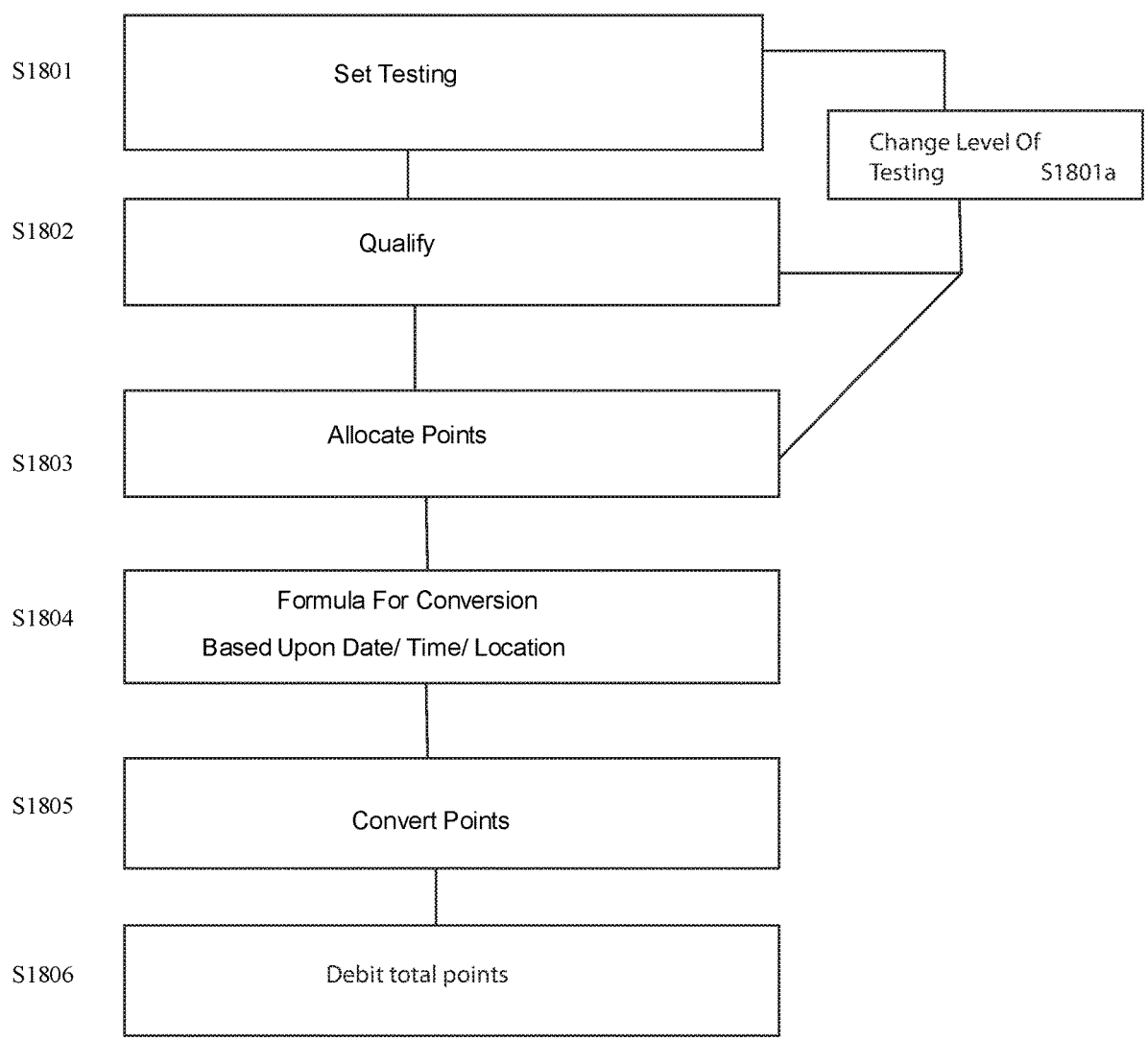

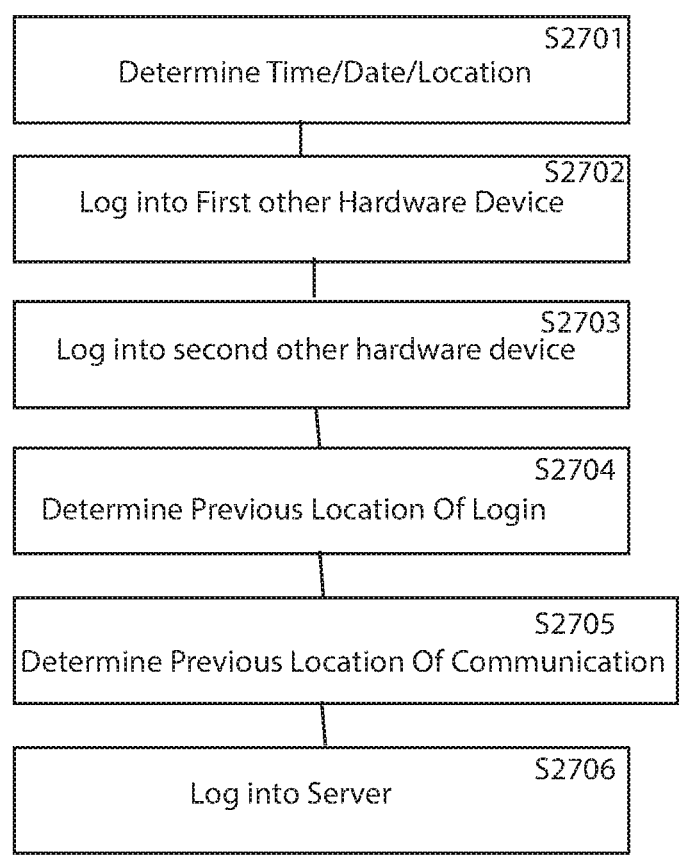

DEVICE AUTHENTICATION SYSTEM AND METHOD

CROSS REFERENCE TO RELATED APPLICATIONS

This application is a non-provisional application that hereby claims priority from provisional application Ser. No. 62/781,155 filed on Dec. 18, 2018, and provisional application Ser. No. 62/864,679 filed on Jun. 21, 2019. This application is also a continuation in part application of Ser. No. 16/013,905 filed on Jun. 20, 2018 (hereinafter the '905 application). The '905 application is a continuation in part application of U.S. patent application Ser. No. 15/241,910, filed on Aug. 19, 2016, wherein that application is a non-provisional of provisional application Ser. No. 62/350,652 filed on Jun. 15, 2016, wherein the '910 application is a continuation in part application of Ser. No. 14/569,403 filed on Dec. 12, 2014, wherein the '403 application is a non-provisional application of 61/916,766 filed on Dec. 13, 2016 the disclosures of all of these applications are hereby incorporated herein by reference in their entirety.

BACKGROUND OF THE INVENTION

There is a system for controlling access to an electronic device that can rely on multiple different authentication methods. In addition the system can require the user to perform particular tasks as well.

SUMMARY OF THE INVENTION

In at least one embodiment, there is a system for controlling access to an electronic device. This embodiment can comprise at least one server having at least one microprocessor, at least one remote device having at least one microprocessor, and at least one GPS location device, wherein the remote device is configured to communicate a location of the remote device wherein the remote device further comprises at least one transceiver configured to communicate wirelessly at least one biometric reader which is configured to read a biometric of a user at least one hardware reader configured to read an identification piece, wherein the electronic device is selectively unlocked via said server authenticating a location of the remote device, a wifi signal of the remote device, a biometric reading of the remote device and a reading of a the hardware reader of the remote device.

In at least one embodiment the electronic device further comprises at least one microphone configured to hear a song.

The system as in claim 1, wherein the hardware reader is a chip reader.

In at least one embodiment the device further comprises at least one nearfield communicator configured to communicate a nearfield signal to a nearfield reader.

In at least one embodiment at least one microprocessor on said at least one server determines whether to unlock the electronic device.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 1 is a block diagram of the different authentication steps to authenticate and unlock a device;

FIG. 18 is an alternative flow chart for the allocation of points;

FIG. 27 is a flow chart for another process for authentication using hardware;

DETAILED DESCRIPTION

Figure 2A:
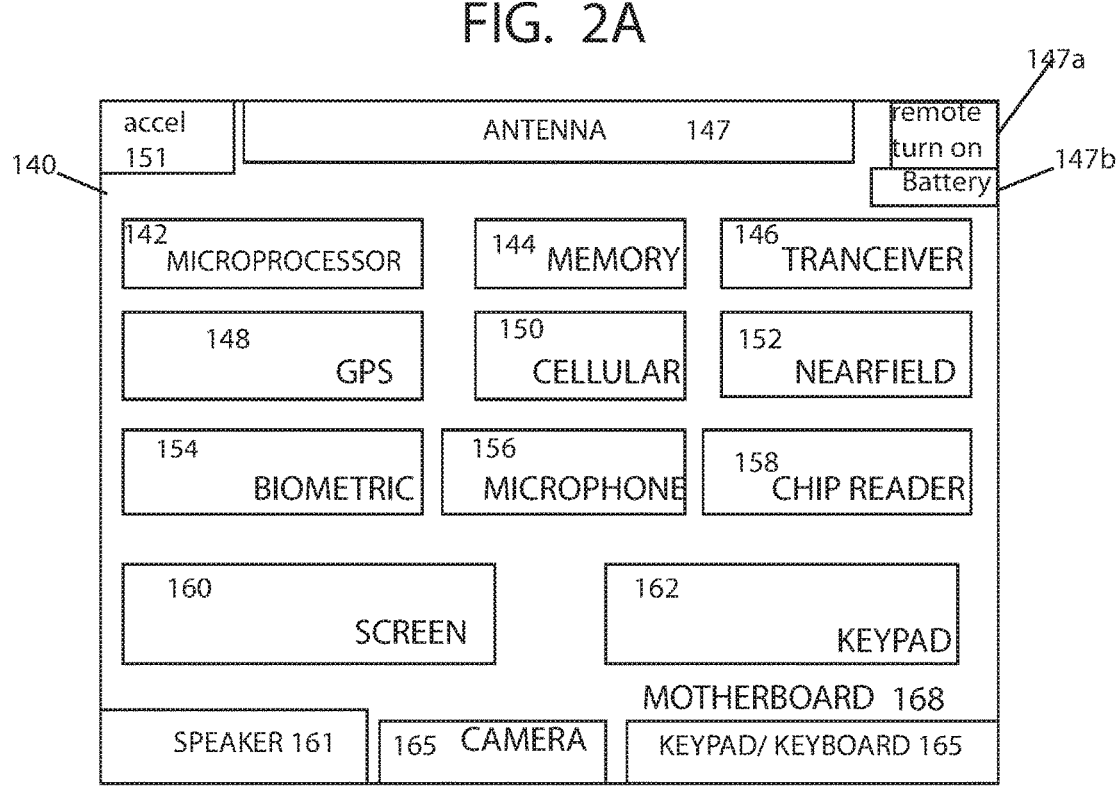
FIG. 2A is a schematic block diagram of the remote device.

FIG. 1 is a block diagram of the different authentication steps to authenticate and unlock a device. In this view there is a block diagram of the factors that are used in deciding whether to unlock a mobile device. For example, in a first group of steps 100 there is a first step for evaluating the time of day 110. Next, in step 112 a server such as server 170 (See FIG. 2B) can evaluate the date for authentication. Next, in step 114, the server 170 can evaluate the remote device 140 (See FIG. 2A) for authentication based upon the location of the device. With this step, the time that the person remains at the location is pertinent as well. The server 170 can evaluate these parameters for either one of user 116 or a second user 118 in combination with the first user 116.

Additional authentication steps can also be used. For example, the system can have an additional step 119 wherein the system can determine the number and order of the Authentication steps. This step can be based upon the time 110, date 112, and location 114 of the user when the user seeks to authenticate to the system. For example, the system can limit the authentication to only two steps such as using only a password and a pin, or to three steps such as using a password and a wireless authentication in step 122.

For example, in step 120 a user such as any-one of user 116 or user 118 can submit a password or pin. In this step, the system can select any one of a password, and/or a pin and any order. (See FIG. 5).

Next, in step 122 any one of user1 116 or user2 118 can submit a wireless authentication. Another step 124 for authentication can include connecting the remote device with an additional hardware such as a chip or a second piece of electronic hardware such as a portable device owned by a second user such as user2 118. In another step 126 the process can include authenticating either one or more users via biometrics. Next, in step 128 the system can authenticate one or more users based upon a pre-set text or email or phone call sent to a server such as server 170. Next, in step 130, the system can authenticate a user based upon whether they press particular buttons on the portable device. The buttons can be in the form of non-key buttons. In this step, based upon the time, date and location of the user when they are pushing buttons the user may have to push the same button a different number of times or push all the different buttons multiple number of times. Next, in step 132, the system can authenticate a user based upon a song that is received by the remote device. When the user identifies the song, the user is authenticated. Next in step 134 the system can authenticate a user based upon the user pressing multiple keys at once.

With this type of login system, a controlling party such as a parent with a child can reward time on a portable user device such as a telephone if the user logs in at a certain time, at a certain location on a certain date. For example, a controlling party could pre-set a time, location and date in a server and then if the user of the portable device logs into that device at a certain time, date, and location, that user could receive a pre-set amount of time on the device as authorized by the controlling party. In addition, depending on the time, date and location, the system could also have a pre-set amount of authentication protocols assigned to the user. For example, on one day such as on October 17, at the user's office, there could be a required amount of protocols such as three. With that requirement, the user of the portable device could then log in using a password, a pin and a third authentication protocol such as a biometric protocol. Alternatively, based upon the time, date and location four protocols could be required such as wireless authentication as well as pin, password, and biometric. Furthermore, rather than having any type of authentication protocol allowed, certain pre-set types of authentication could be required such as only a password, pin, wireless authentication and biometrics. Any other type of authentication that is alternatively open would be seen as either irrelevant or possibly an error. If the user authenticating the device fails to correctly enter the proper types of authentication, then that user after a certain pre-set number of attempts would be locked out.

FIG. 2A shows a schematic block diagram of a remote device which can be used to allow a user to authenticate into this device. With this design there is the remote device 140 having a motherboard 168. Positioned on the motherboard is a microprocessor 142, a memory 144, a transceiver 146, a GPS 148, a cellular transceiver 150, a nearfield communication device 152, a biometric sensor 154, a microphone 156, a chip reader 158, a screen 160, a keypad 162 which includes buttons. The keypad does not have to be a keyboard but simply at least one button. There can be a speaker 161, a camera 164, and a separate keyboard 165. The keyboard 165 can be part of a screen or as a stand-alone keyboard separate from a screen (either as a stand-alone keypad or as an on board virtual keypad). The device can also include an accelerometer and/or gyroscope 151 which is configured to monitor the movement of the remote device such as calculate the steps taken using the remote device.

Figure 2B:
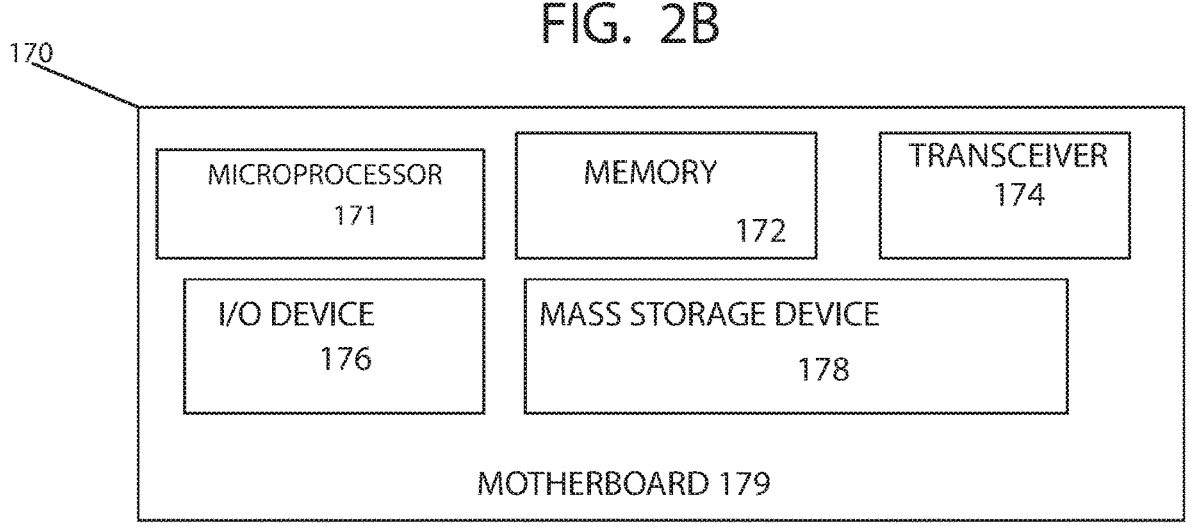
FIG. 2B is a schematic block diagram of the server.

FIG. 2B is a schematic block diagram of the server 170 (or otherwise non-portable computer) which can be in communication with the remote device 140. For example, the server 170 includes a motherboard 179, a microprocessor 171, a memory 172, a transceiver 174, an I/O device 176, and a mass storage device 178. The microprocessor 171, the memory 172, the transceiver 174 and the I/O device are all disposed on the motherboard 179. The server 170 can communicate with the remote device 140 through any suitable network such as through the internet, through direct cellular communication, through any suitable wireless network or any other computer network suitable for communication. The server(s) and remote portable electronic devices can be configured in a network.

Figure 3:
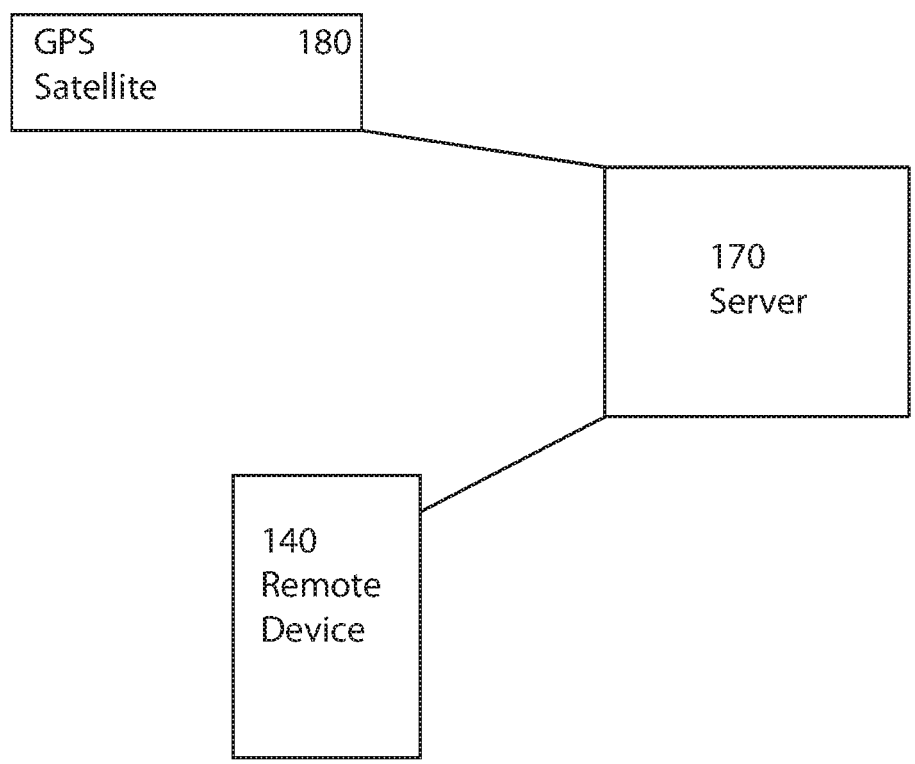
FIG. 3 is a layout of a first network.

For example, FIG. 3 is a layout of a first network. This first network can include server 170, remote device 140, and a GPS satellite 180 which is in communication with the GPS satellite 180 directly. This GPS satellite can also be in communication with server 170 as well. There can also be a cell phone tower 181 which is configured to allow the remote device 140 and/or the server 170 to communicate with a cellular network as well. There is also a cellular server 183 which is configured to communicate with a cell phone tower 181. With this design, the remote device such as remote device 140 can then be authenticated through a cellular service through cell phone tower 181 via cellular server 183. Cellular server 183 can then forward the authentication credentials of the remote device on to server 170 to further authenticate the remote device 140.

Figure 4:
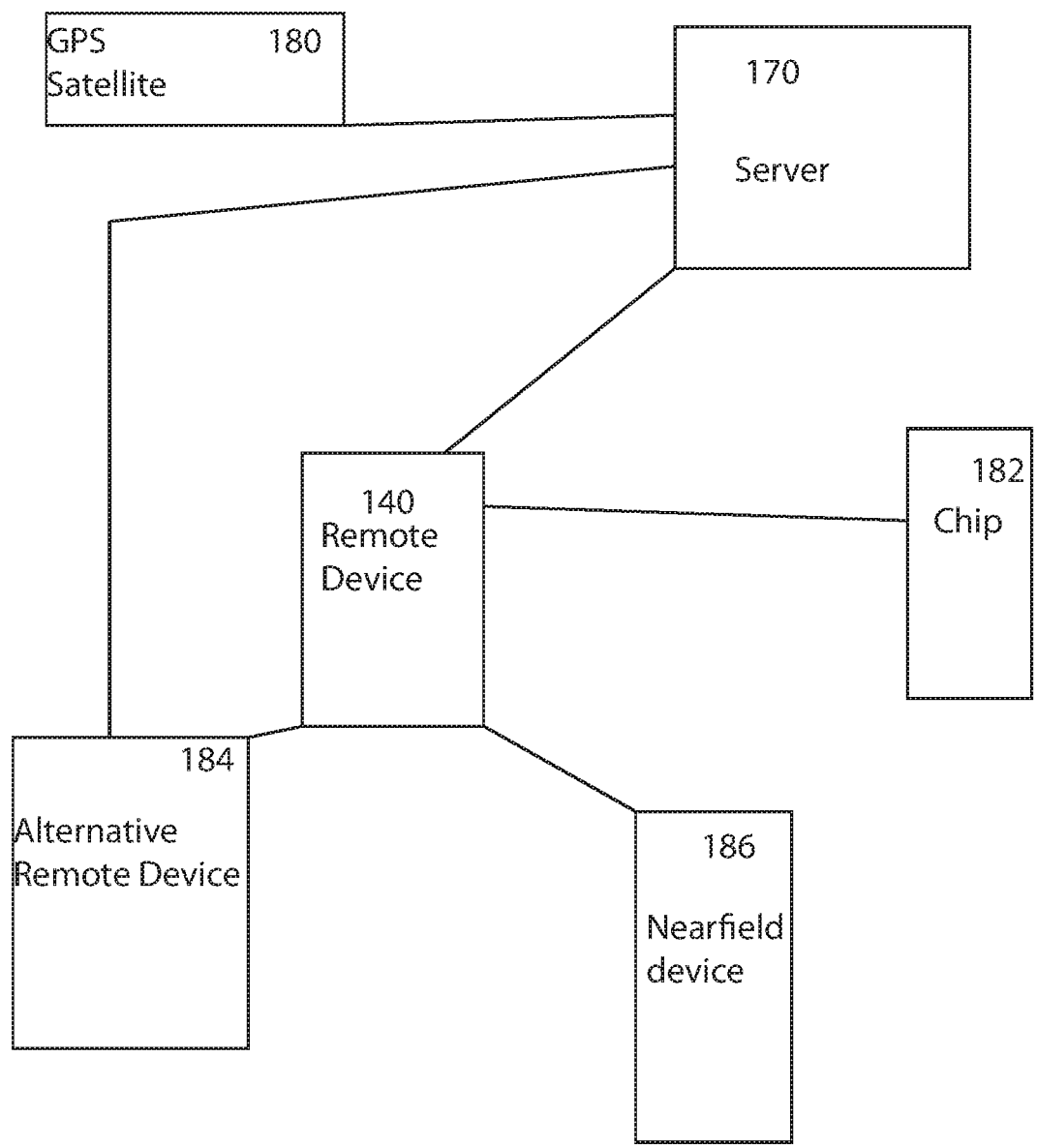
FIG. 4 is a layout of a second network.

FIG. 4 is a layout of a second network. In this network there is a GPS satellite 180, a server 170, a remote device 140 as in the previous network. However, there are also additional peripheral devices such as a chip reader 182, an alternative remote device 184, and a nearfield communication device 186. Other types of communication networks can also be used as well. In addition, as shown in FIG. 3, there is a cell phone tower such as cell phone tower 181 which is configured to communicate with the remote device 140 the alternative remote device 184 or with the server 170. To achieve two-factor authentication with a remote device, the alternative remote device 184 can be in communication with the server 170 as well as the remote device 140. For example, the remote device 140 can communicate with server 170 to request authentication. Next, the alternative remote device 184 can receive a communication from the server to register and login. The user can then login to the alternative remote device to send a signal to server 170 such that the user on the first remote device 140 can then be further authenticated in to the server. This then allows the user on the first remote device 140 to have greater access to the server. In addition, the system can also allow for the first remote device 140 to be further authenticated with the server 170 via chip 182 and nearfield device 186 as well.

Figure 5:
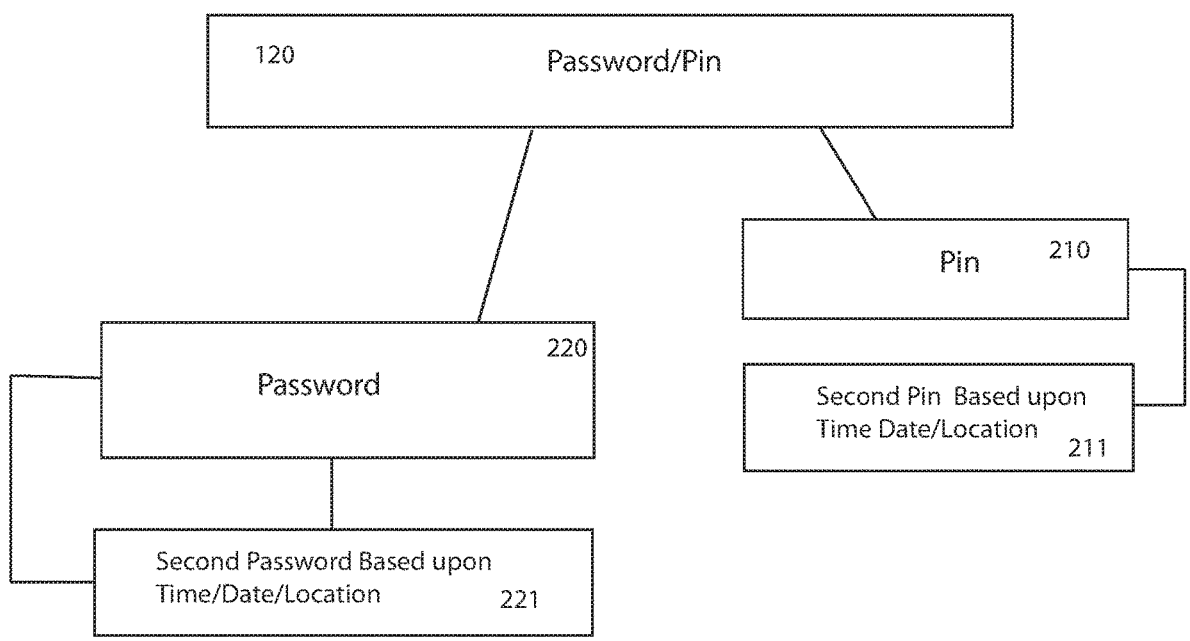
FIG. 5 is a view of one of the steps shown in FIG. 1.

FIG. 5 is an expansion of the view of the step 120 shown in FIG. 1. For example, in this step, the remote device can receive a pin 210, a password 220, or a pin 210/password 220 combination. Thus, there is essentially a two-factor authentication for the remote device which can be controlled either internally through the remote device or remotely controlled via server 170. In addition, a second password and or a second pin can be required as well if the user is in a particular location, or is logging in at a particular time or on a particular date or with respect to a combination of a particular time/date and location.

Figure 6:
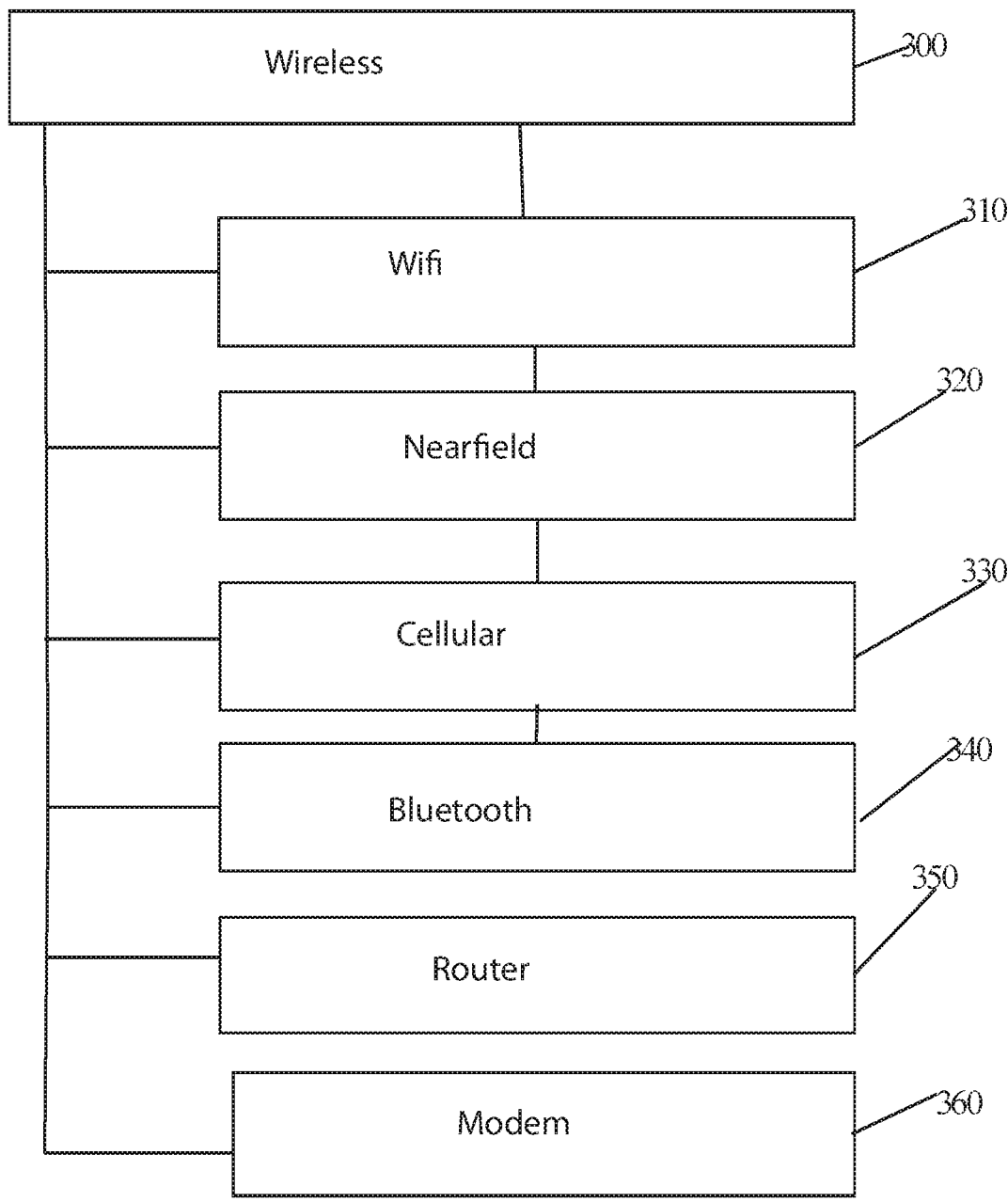
FIG. 6 is an in depth view of another step shown in FIG. 1.

FIG. 6 is an in-depth view of another step shown in FIG. 1 which shows the step of initiating wireless authentication. For example, this step starts in step 300 wherein the user can initiate wireless authentication of his or her remote device by connecting to another device. For example, the user with the remote device can connect that device via WIFI to an adjacent router in step 310. Alternatively, or in addition, the user can connect in step 320 to a nearfield communication device. This allows the remote device to connect with the nearfield chip 152. Alternatively, the user can connect using their cell phone provider to further authenticate the device in step 330. This allows the user to connect with a remote cell phone tower. Once the remote device is authenticated on the cellular network, the identity of the cellular card such as a SIM card can be forwarded by the cellular network to the server for allowing the user to be authenticated on the remote device. In this case, there can be a second server such as a remote cellular server 183 which then serves to authenticate the user on the cellular network. In another step such as with step 340, the user with a remote device 140 can further authenticate the device via a Bluetooth connection in step 340. With this step, the remote device 140 can connect to a Bluetooth remote device such that once there is a particular connection to this Bluetooth remote device it serves as an authentication handshake thereby providing further authenticating information allowing the remote device 140 to be authenticated on the server 170 in the network.

Alternatively, or in addition, in step 350 the remote device 140 can be authenticated via wired connection to a router in step 350. This connection can occur through a wired network such that when the remote device 140 is connected to the router 350, the router then sends along a handshake signature indication to the server 170 to indicate that the remote device 140 has connected to a particular router. This could be as simple as when the remote device connects to this router in step 350, the server 170 reads the MAC address of this router to confirm that this remote device is connecting through a particular router.

Next, in step 360 the user using remote device 140 can connect through a remote modem 360 to connect to remote server 170. As described above with the router in step 350, the MAC address of this modem can be forwarded on to the remote server 170 so that the user's remote device can then be authenticated with server 170.

Each of these above steps allows for the wireless connection between remote device 140 and a remote server 170.

The connection itself can then serve as a means for authenticating the device 140 with server 170.

Figure 7:
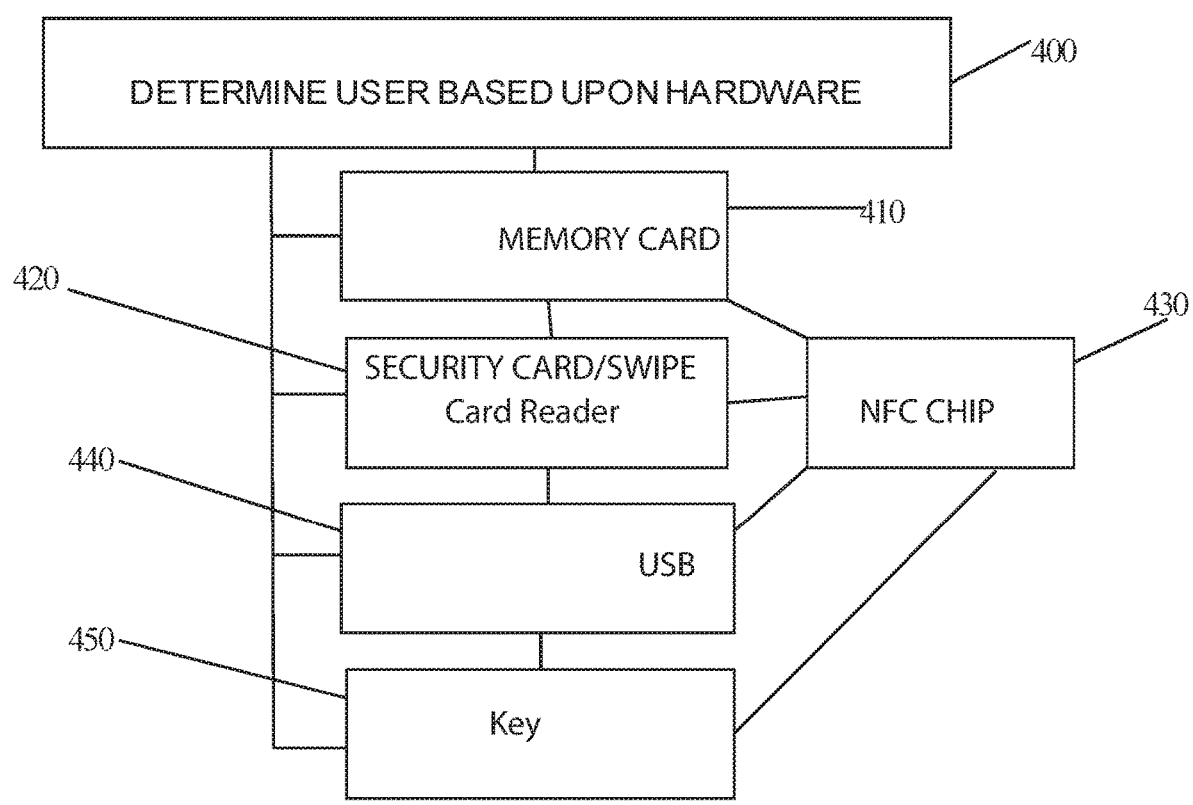
FIG. 7 is an in depth view of another step shown in FIG. 1.

FIG. 7 is an in-depth view of another step shown in FIG. 1. With this series of steps there is a step series 400 which is simply a more elaborate version of step 124 shown in FIG. 1. For example, in step series 400, the remote device 140 can be coupled to a particular memory card in step 410. The information from this memory card in step 410 is then forwarded to microprocessor 142 (See FIG. 2A) or on to server 170 to authenticate the device either locally or across a computer network. Alternatively, or in addition, in step 420 the user can connect the remote device 140 to a security card swipe reader in step 420. In this step, once the remote device 140 is connected to the card reader in step 420 the security card can be swiped thereby relaying the authentication information on to microprocessor 142 or on to server 170 for further authentication of the remote device. In another step, such as in step 440, the user can connect the remote device 140 to a USB device to provide authentication information either to microprocessor 142 or on to server 170 to further authenticate the device. Next, in addition or in the alternative, in step 450 the user can insert a key into the remote device 140 to further send information to microprocessor 142 on the remote device or onto server 170 to further authenticate the device. In addition, or in the alternative, the user can connect the remote device 140 to a NFC chip in step 430 such that the NFC chip sends authentication information on to microprocessor 142 and/or onto server 170 as well. This then allows the remote device to be authenticated using one or more direct or near direct connections to the device to unlock and thereby authenticate the device. In at least one embodiment, the system can require the presence of both a memory card and a USB connection. In at least one embodiment, the memory card and the USB connection are keyed to each other so that the presence of the USB connection requires the connection to the memory card as well.

Figure 8:
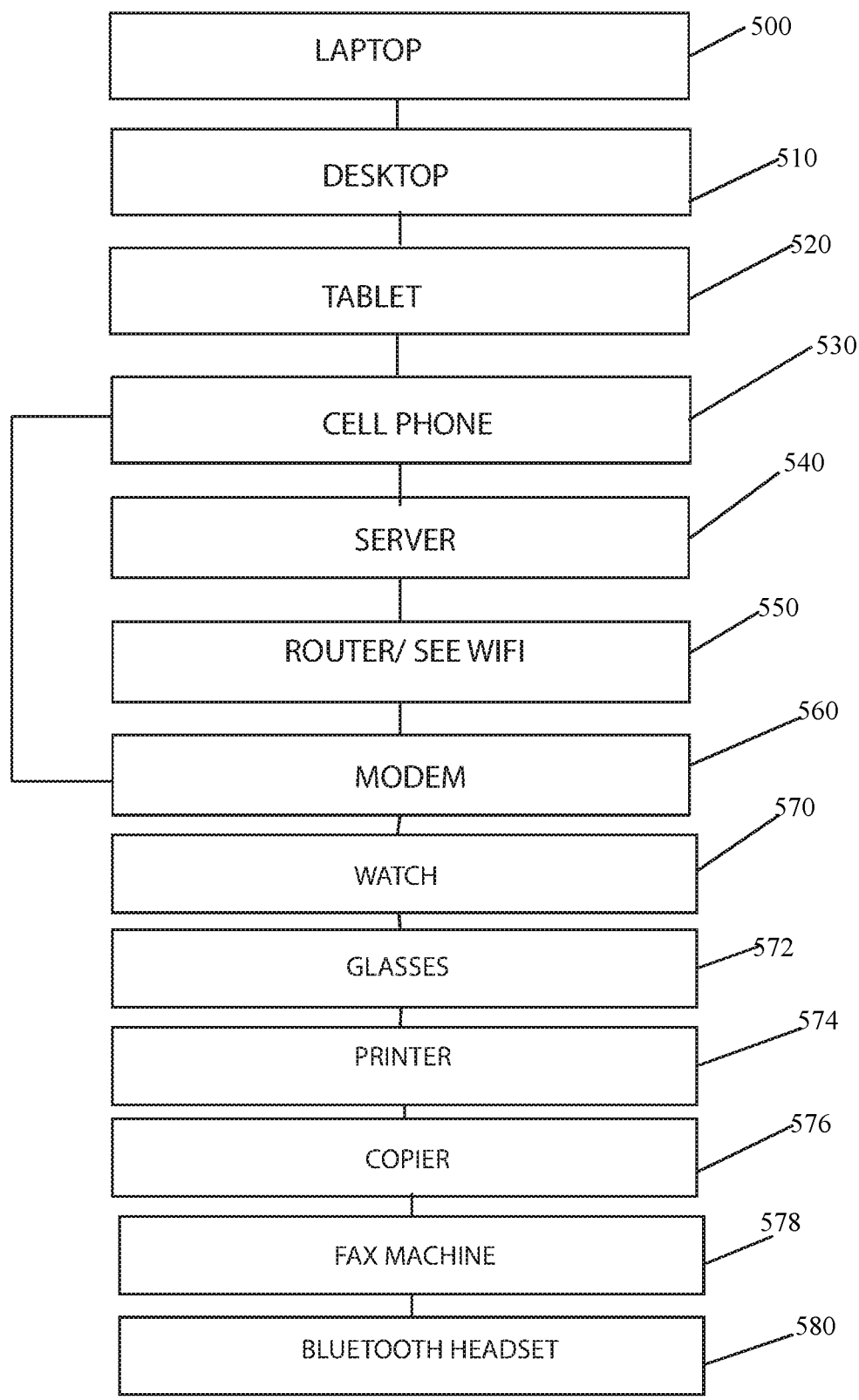
FIG. 8 is a block diagram of the other authentication devices.

FIG. 8 is a block diagram of the other authentication devices which can be used with a primary device so as to coordinate authentication. For example, the remote device 140 can also be coordinated to log into a server 170 via other remote devices. For example, in step 500 a remote device can first be authenticated with another remote device such as a laptop. Once the remote device is authenticated with a pre-selected laptop, the remote device can then be self-authenticated by matching identity information from the laptop with the login information from the remote device with microprocessor 142. Alternatively, this authentication information can then be forwarded to a remote server for further authentication.

Step 510 involves the remote device 140 authenticating with either itself or with a remote server 170 by authenticating or communicating with a desktop in step 510. Thus, with this step, there could either be self-authentication by the remote device 140 or remote authentication with a server once the remote device 140 is authenticated first with the desktop device 510. The authentication with the desktop can either be through an electronic handshake or through a public/private key or through any other suitable connection.

Alternatively, or in addition the remote device 140 can also authenticate through a tablet as shown in step 520. With this step, the remote device 140 can either first authenticate via an electronic handshake or through a public key-private key authentication. Once the remote device 140 is authenticated with the tablet, the remote device can either self-authenticate with its own microprocessor 142 to allow access to the remote device and/or authenticate with server 170.

Alternatively, or in addition the remote device 140 can also authenticate through a cell phone as shown in step 530. With this step, the remote device 140 can either first authenticate via an electronic handshake or through a public key-private key authentication with the cell phone. Once the remote device 140 is authenticated with the cell phone, the remote device can either self-authenticate with its own microprocessor 142 to allow access to the remote device and/or authenticate with server 170.

Alternatively, or in addition the remote device 140 can also authenticate through another server as shown in step 540. With this step, the remote device 140 can either first authenticate via an electronic handshake or through a public key-private key authentication with the server. Once the remote device 140 is authenticated with the server, the remote device can either self-authenticate with its own microprocessor 142 to allow access to the remote device and/or authenticate with server 170.

Alternatively, or in addition the remote device 140 can also authenticate through a router as shown in step 550. With this step, the remote device 140 can either first authenticate via an electronic handshake or through a public key-private key authentication with the router. Once the remote device 140 is authenticated with the router, the remote device can either self-authenticate with its own microprocessor 142 to allow access to the remote device and/or authenticate with server 170.

Alternatively, or in addition the remote device 140 can also authenticate through a modem as shown in step 560. With this step, the remote device 140 can either first authenticate via an electronic handshake or through a public key-private key authentication with the modem. Once the remote device 140 is authenticated with the modem, the remote device can either self-authenticate with its own microprocessor 142 to allow access to the remote device and/or authenticate with server 170.

Alternatively, or in addition the remote device 140 can also authenticate through a modem as shown in step 560. With this step, the remote device 140 can either first authenticate via an electronic handshake or through a public key-private key authentication with the modem. Once the remote device 140 is authenticated with the modem, the remote device can either self-authenticate with its own microprocessor 142 to allow access to the remote device and/or authenticate with server 170.

Alternatively, or in addition the remote device 140 can also authenticate through a watch as shown in step 570. With this step, the remote device 140 can either first authenticate via an electronic handshake or through a public key-private key authentication with the watch. Once the remote device 140 is authenticated with the watch, the remote device can either self-authenticate with its own microprocessor 142 to allow access to the remote device and/or authenticate with server 170.

Alternatively, or in addition the remote device 140 can also authenticate through glasses as shown in step 572. With this step, the remote device 140 can either first authenticate via an electronic handshake or through a public key-private key authentication with the glasses. Once the remote device 140 is authenticated with the glasses, the remote device can either self-authenticate with its own microprocessor 142 to allow access to the remote device and/or authenticate with server 170.

Alternatively, or in addition the remote device 140 can also authenticate through a printer as shown in step 574. With this step, the remote device 140 can either first authenticate via an electronic handshake or through a public key-private key authentication with the printer. Once the remote device 140 is authenticated with the printer, the remote device can either self-authenticate with its own microprocessor 142 to allow access to the remote device and/or authenticate with server 170.

Alternatively, or in addition the remote device 140 can also authenticate through a copier as shown in step 576. With this step, the remote device 140 can either first authenticate via an electronic handshake or through a public key-private key authentication with the copier. Once the remote device 140 is authenticated with the copier, the remote device can either self-authenticate with its own microprocessor 142 to allow access to the remote device and/or authenticate with server 170.

Alternatively, or in addition the remote device 140 can also authenticate through a fax machine as shown in step 578. With this step, the remote device 140 can either first authenticate via an electronic handshake or through a public key-private key authentication with the fax machine. Once the remote device 140 is authenticated with the fax machine, the remote device can either self-authenticate with its own microprocessor 142 to allow access to the remote device and/or authenticate with server 170.

Alternatively, or in addition the remote device 140 can also authenticate through a Bluetooth headset as shown in step 580. With this step, the remote device 140 can either first authenticate via an electronic handshake or through a public key-private key authentication with the Bluetooth headset. Once the remote device 140 is authenticated with the Bluetooth headset, the remote device can either self-authenticate with its own microprocessor 142 to allow access to the remote device and/or authenticate with server 170.

Figure 9A:
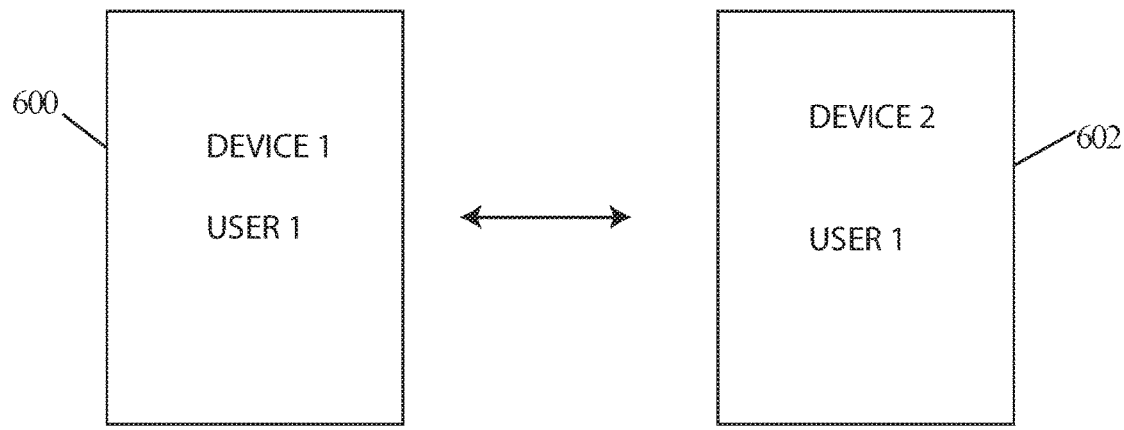
FIG. 9A is a view of a first connection of users.

FIG. 9A is a view of the different users and different devices used to authenticate the devices. For example, a first user using a first device 600 can communicate with a second device still operated by the first user 602. An example of this would be when a user has to show two-factor authentication such as authentication on their remote device 140 and authentication using another external device owned by the user such as a laptop as shown for example in step 500. (See FIG. 8 for the process for authenticating using an additional remote device).

Figure 9B:
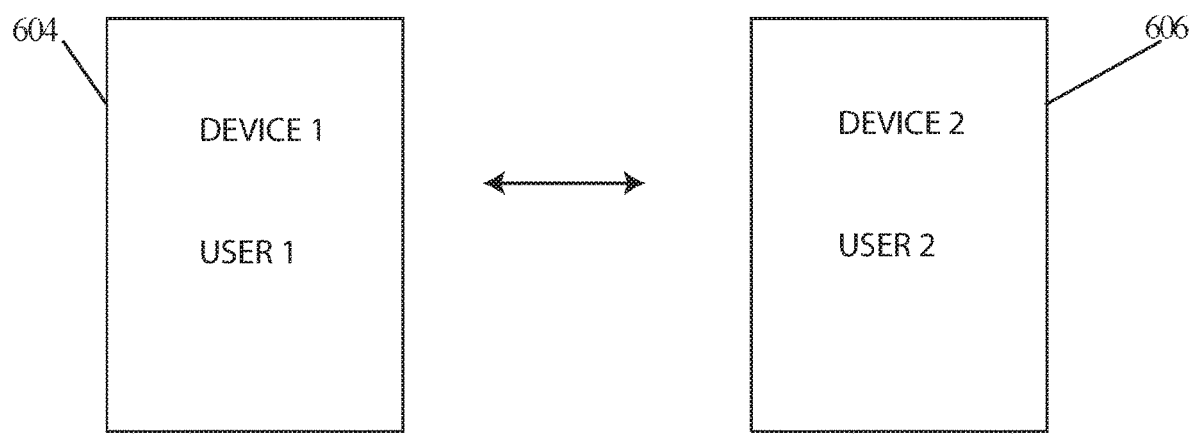
FIG. 9B is a view of another connection of users.

FIG. 9B is a view of another way for authentication of a device such as remote device 140. For example, a first device used by user1 604 can be authenticated by another device by a second user 606.

Figure 9C:
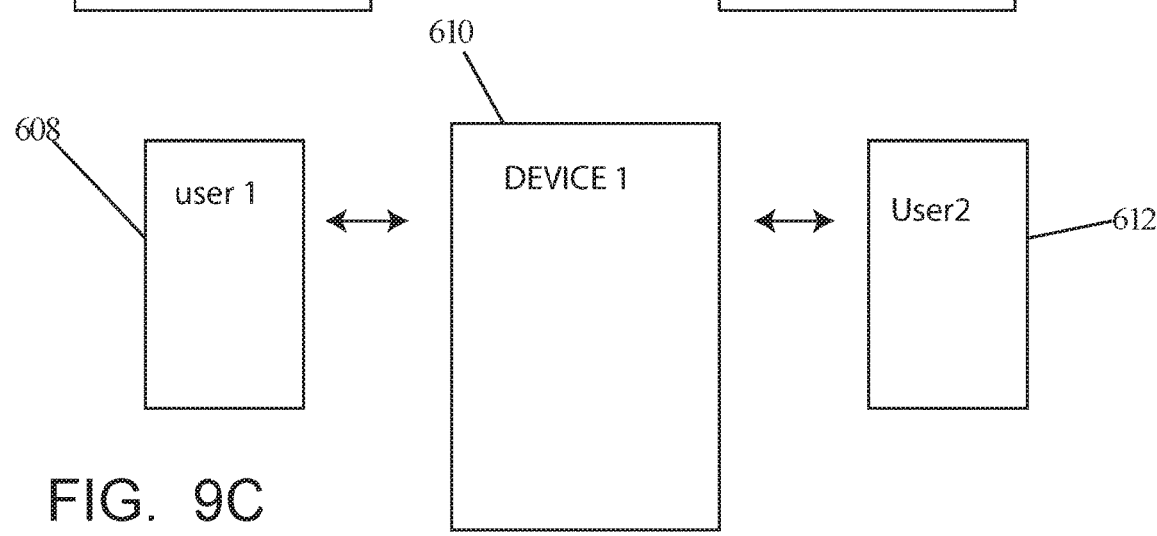
FIG. 9C is a view of another connection of users.

FIG. 9C shows a single device 610 which can be logged on by two different users such as user1 608, or a user2 612. Thus, two different users can log onto one single device 610.

Figure 10:
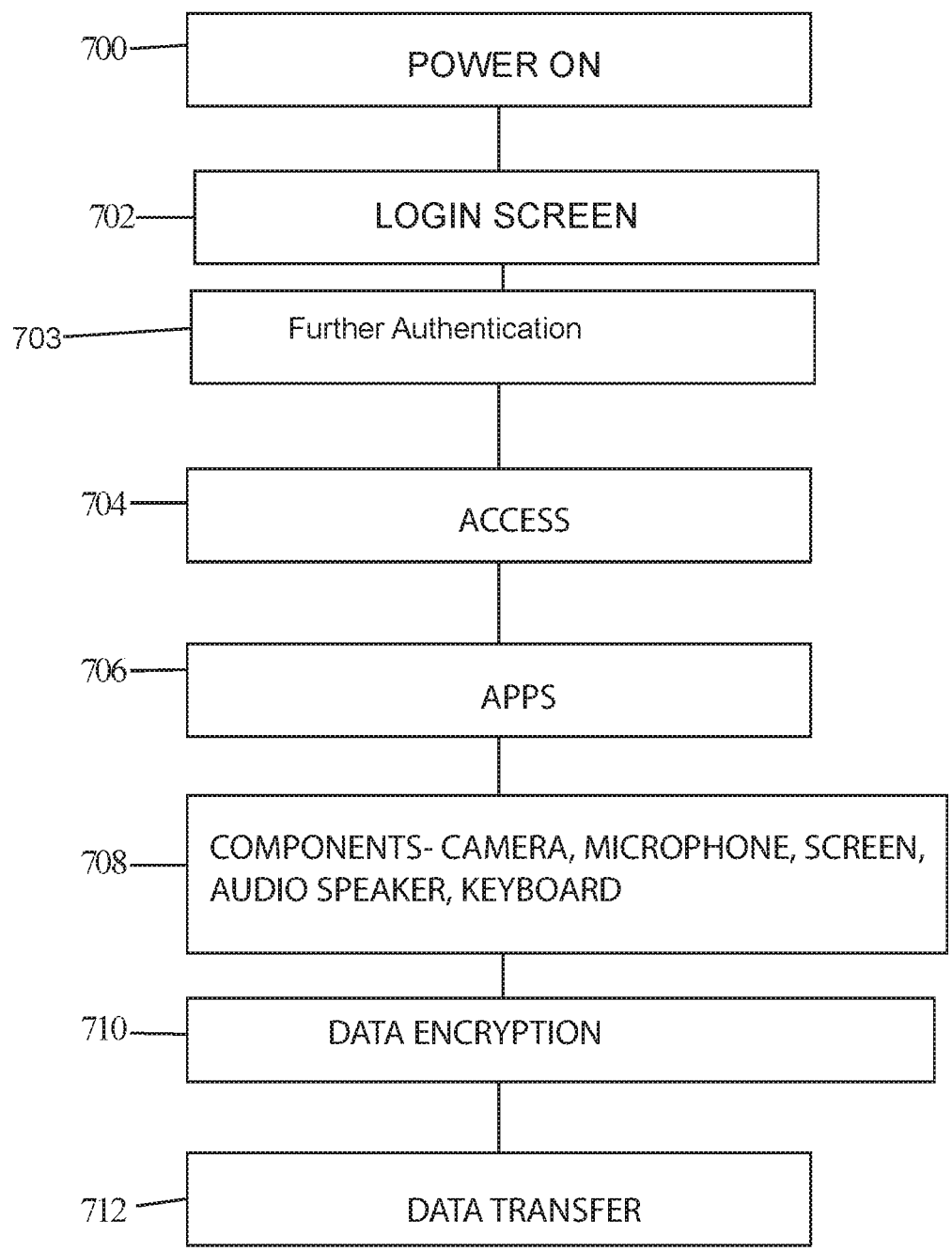
FIG. 10 is a view of the process for unlocking a device.

FIG. 10 is a view of the process for using the device before and after unlocking a device. With this there is a process for turning on the device which starts with step 700 where the user powers on the device. Next, in step 701 the user can log in via a login screen in step 702. With this the login process can be through the process outlined in FIG. 1 or through any other process outlined herein. In step 703 the user can also obtain further authentication from either the local device or the remote server as shown in FIGS. 1-9. Next, in step 704 the user gains access to the electronic device. Next, in step 706, the user is selectively granted access to applications based upon the authentication level obtained in step 703. Next, in step 708, the user is selectively granted access to different components of the portable electronic device such as access to a camera, a microphone, a screen, an audio speaker, and/or a keyboard. Next, in step 710 the user is granted access to files that may be encrypted based upon the level of authentication achieved by the user in step 703. Next, in step 712 the user is granted access to transfer data based upon the level of authentication that the user achieved in step 703. Thus, once the user is granted a pre-set level of access or authentication in step 703, the user can then access that device to the extent that the user has access.

In addition, either in conjunction with the authentication or separate from the authentication, once a user is logged onto a remote electronic device, the system can then be configured to control the amount of time that a user would spend on a device or to allow the user to further earn points to be either loaned to other users or to be used for future time on the device or to deduct time and/or points on the device to further restrict the user as well.

Figure 11:
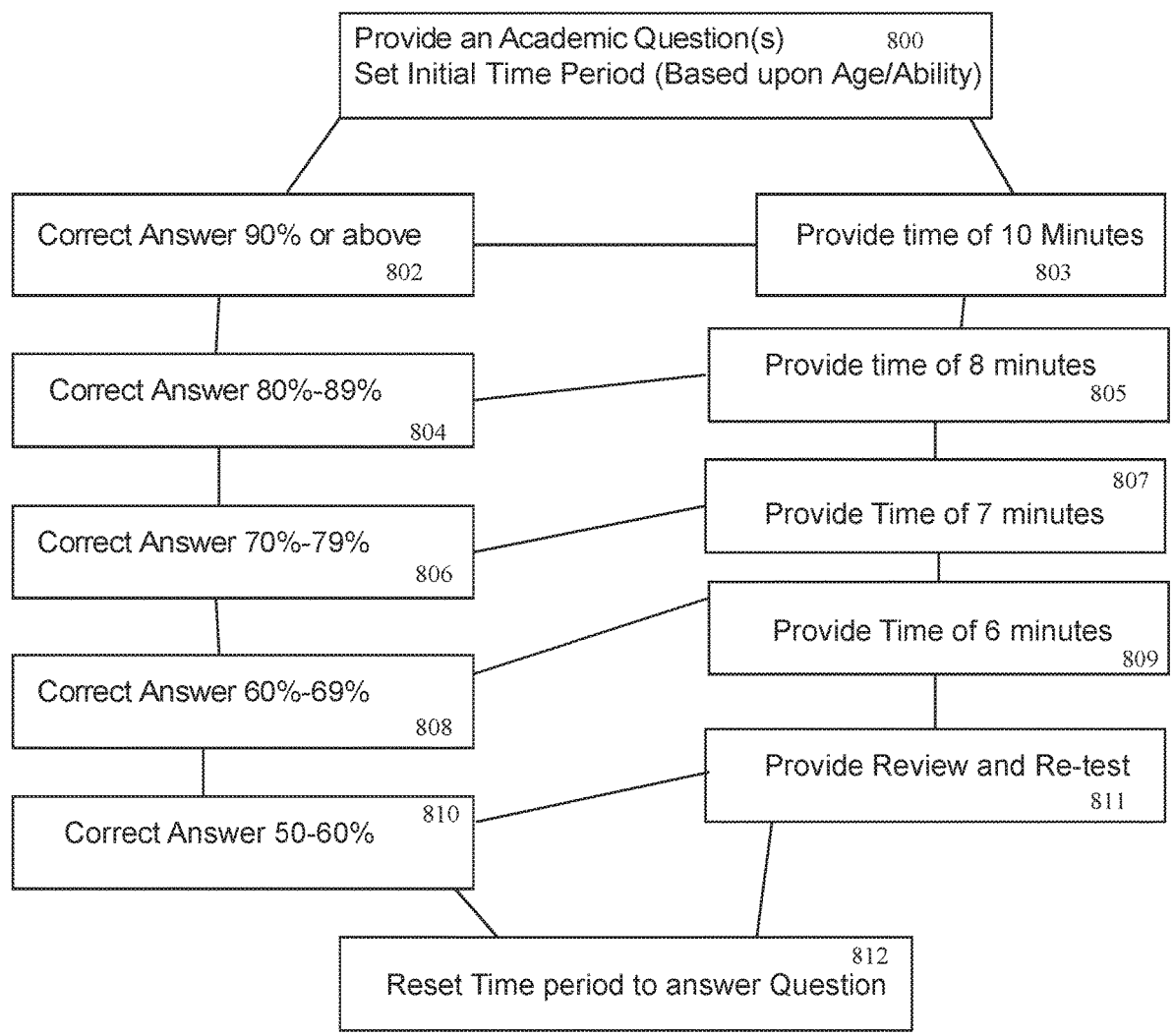
FIG. 11 is a flow chart of the process for unlocking time based upon academic questions.

For example, FIG. 11 is a flow chart of the process for unlocking time based upon academic questions. With this flow chart, the system can present a user with one or more academic questions which can be pre-screened based upon the user's age or academic level in step 800. Next, in step 802 if the system determines that the user answered above 90% it determines that the user can have a pre-set minimum amount of time such as for example 10 minutes of time with the electronic device. Alternatively, if the system determines that the user has completed the answers correctly between 80 and 89% then the system can provide the user with a pre-set amount of time on the electronic device such as 8 minutes of time in step 805. Other levels of time can also be determined based upon the percentage of questions answered correctly, for example, if the correct number of answers was between 70-79% as shown in step 806, then the system would provide 7 minutes of time in step 807, if it was between 60 and 69% in step 808, then the system would provide 6 minutes of time in step 809, if it determined that it was between 50 and 60% in step 810 then the system would prompt the user to review the material first and then re-set the questions in step 811. Next, in step 812 the system can then re-set the time period and re set the questions back in step 800.

Figure 12:
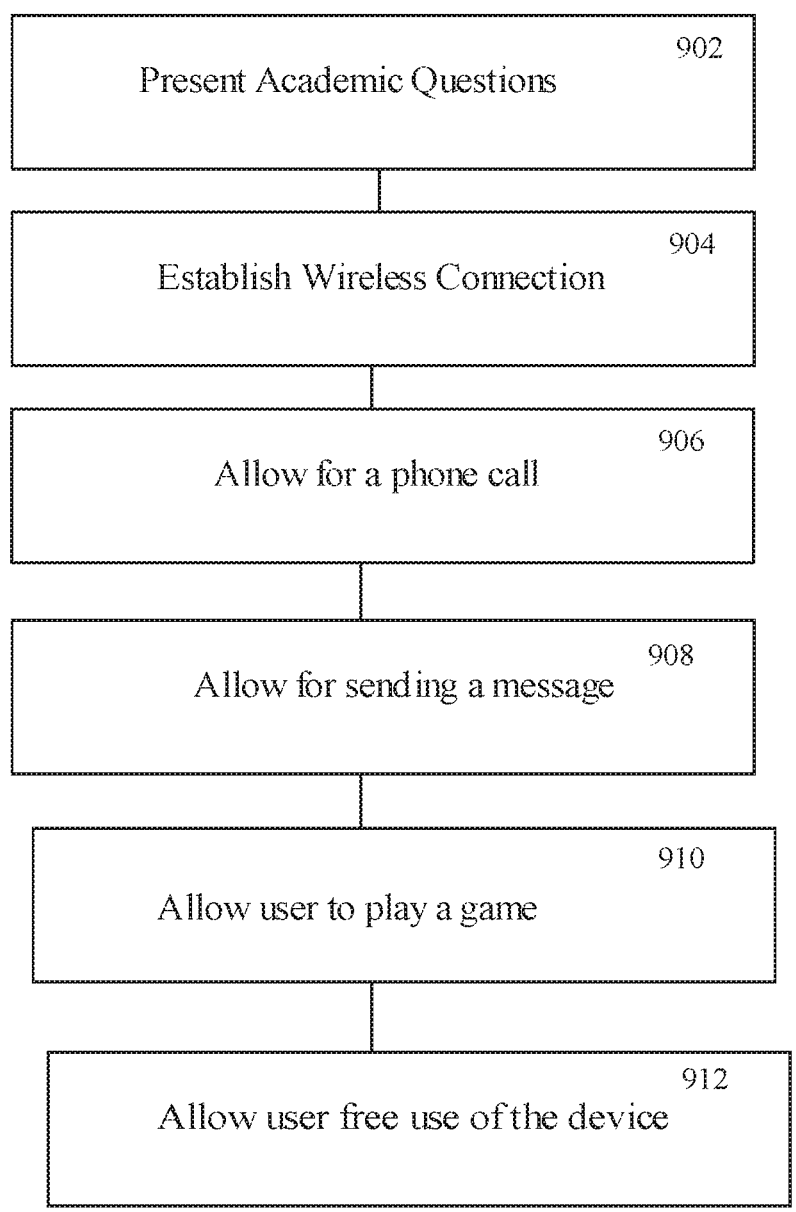
FIG. 12 is a flow chart of the process for unlocking particular privileges of an electronic device.

FIG. 12 is a flow chart of the process for unlocking particular privileges of an electronic device such as by asking academic questions. For example, in step 902 the system can present academic questions such as that shown in FIG. 11. Points or time can be awarded to each user upon completion of a question or a series of questions. Upon completion of these questions, the system can establish a wireless connection in step 904. This wireless connection is based upon the access granted shown in FIG. 11. Next, in step 906, depending on the level of authentication, the system can allow the user to place a phone call. Next, in step 908, the system can allow the user to send a message to another user. Next, in step 910, the system can then allow a user to play a game depending on the level of authentication that is granted to the user. Alternatively, in step 912 the system grants free access to the user so that the user can use the device for the pre-designated period of time set forth in FIG. 11.

Figure 13:
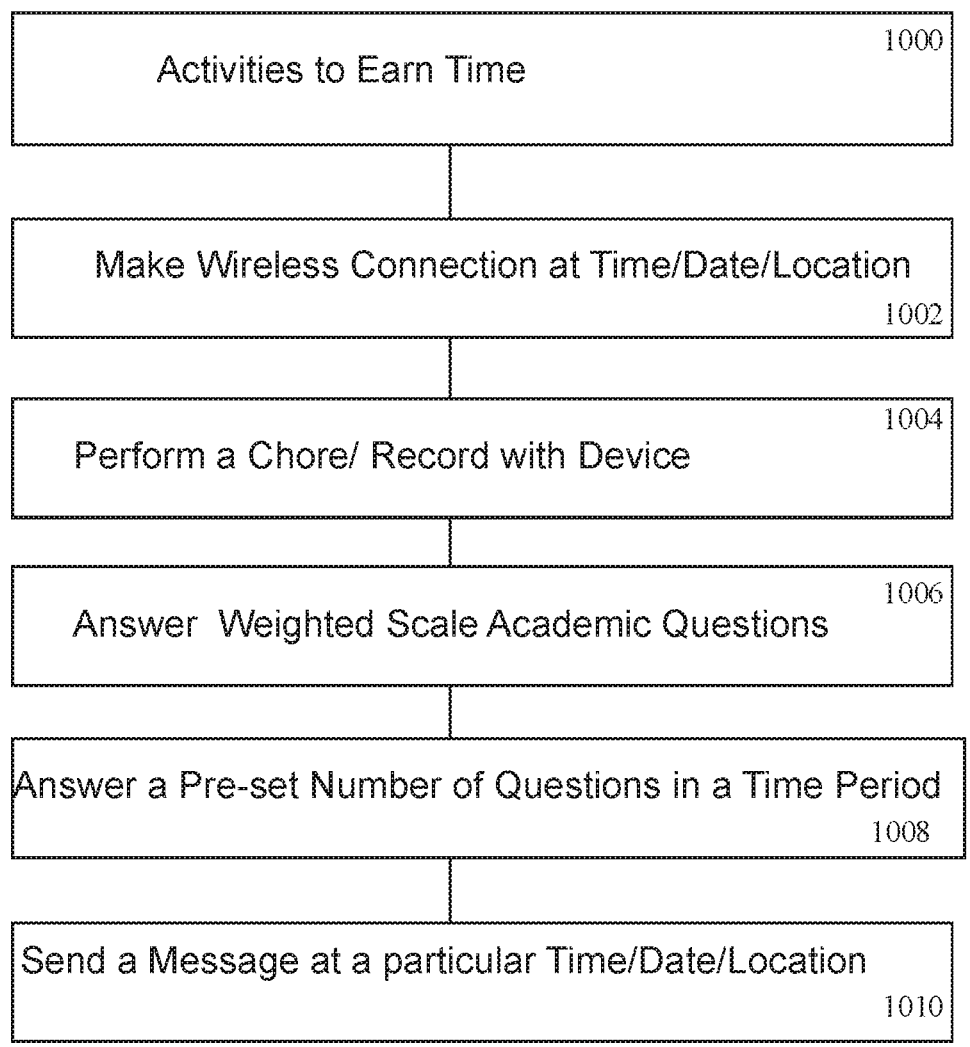
FIG. 13 is a flow chart of other activities that parties can do to unlock a pre-set amount of time.

FIG. 13 is a flow chart of other activities that parties can do to unlock a pre-set amount of time. These activities can be either in addition to, or in the alternative to the academic questions granted in FIG. 11. For example, in step 1000 the system can set forth or present activities to the user. One of these activities can be that the user must make a wireless connection to another device at a pre-set time, date and location. For example, if a party wanted another party to appear at a location, the system can then set that the user must appear at that location and set a wireless connection to a wireless device at a pre-set time, at a pre-set location and on a pre-set date. Another activity can include that the user can perform a chore and then record that chore on the device in step 1004. Another step can include that the user answer weighted scale academic questions in step 1006. The weighted scale can be such that if for example a $4^{th}$ grader answers a sufficient number of $6^{th}$ grade level questions in a predetermined period of time, that user can then unlock a pre-set amount of time on the electronic device. Another activity can include that the user answer a pre-set number of questions in a time period in step 1008. Another activity can include that the user send a message to another electronic device at a pre-set time/date and location. Upon completion of each of these activities or after a series of different activities the user is then rewarded with either time or points which can be either loaned out or converted into time or access to applications "apps" in the future.

Figure 14:
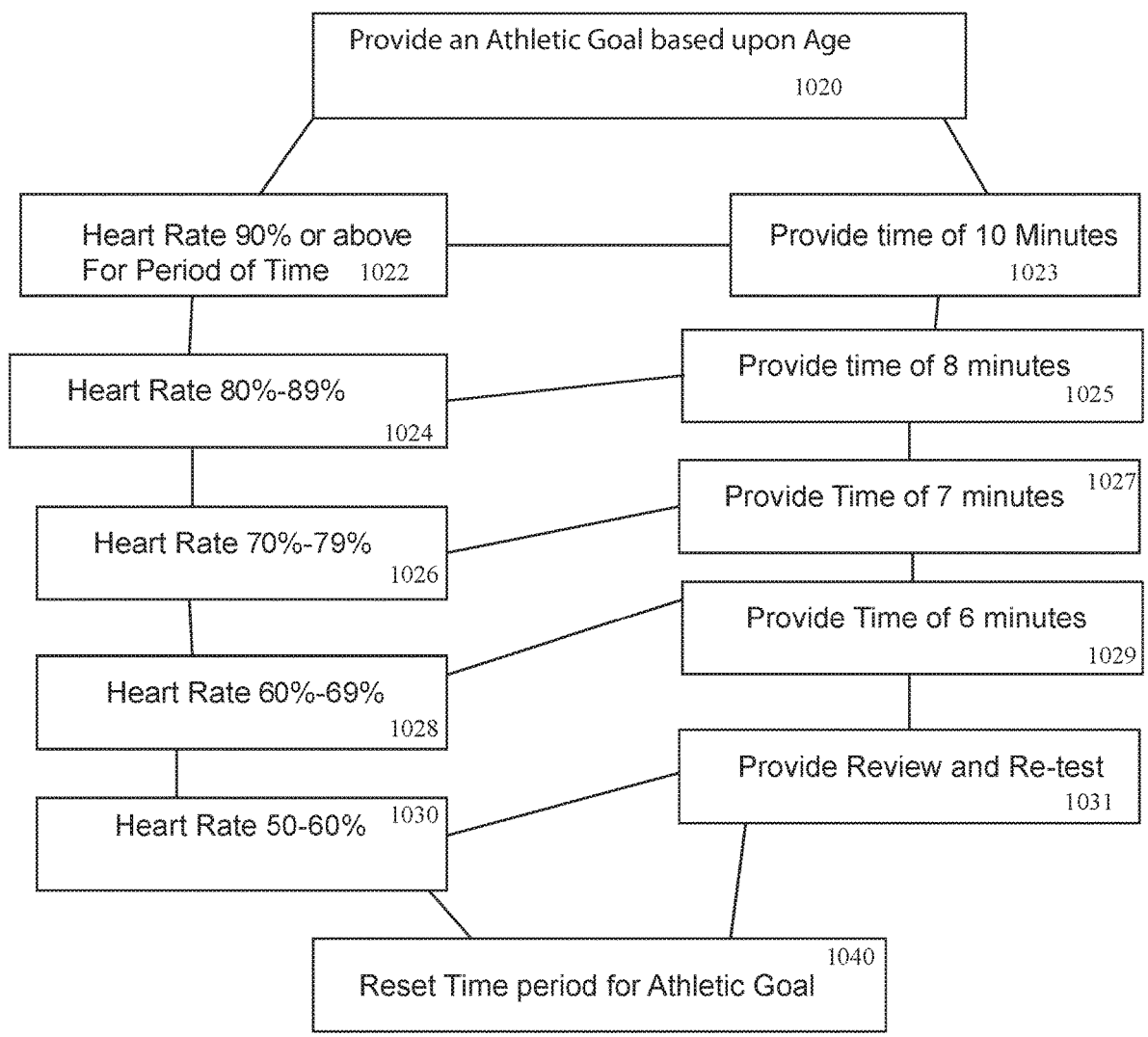
FIG. 14 is an alternative reward system involving exercise.

FIG. 14 is another example of a rewards system for a user logging into the remote device. For example, a controller can pre-set with a server such as server 170 a pre-set athletic goal based upon the age of the user in step 1020. If the user achieves these pre-set goals then that user would be authenticated for a pre-set period of time. For example, in step 1022 if the user elevated their heart rate at 90% of their max for a pre-set period of time, that user would be rewarded with a pre-set period of time such as for 10 minutes. Alternatively, if the user elevated his or her heart rate above 80% for a pre-set period of time in step 1024, then that user would be awarded additional time such as a pre-set period of time for 8 minutes in step 1025. Alternatively, in step 1026 if that user elevated their heart rate above 70% for a pre-set period of time then that user could be awarded a pre-set period of time such as seven minutes in step 1027. Alternatively, if the user engages in athletic activity where his heart rate is above 60% then that user could be rewarded with additional bonus time such as for six minutes in step 1029. Alternatively, if the user had his heart rate at 50-60% percent then the user could be provided a review and re-test in step 1031. Thus, the user can then be rewarded with either points and/or time if the user completes these athletic feats. Alternatively the user can be penalized points and/or time depending on whether the user fails to complete these tasks.

Figure 15:
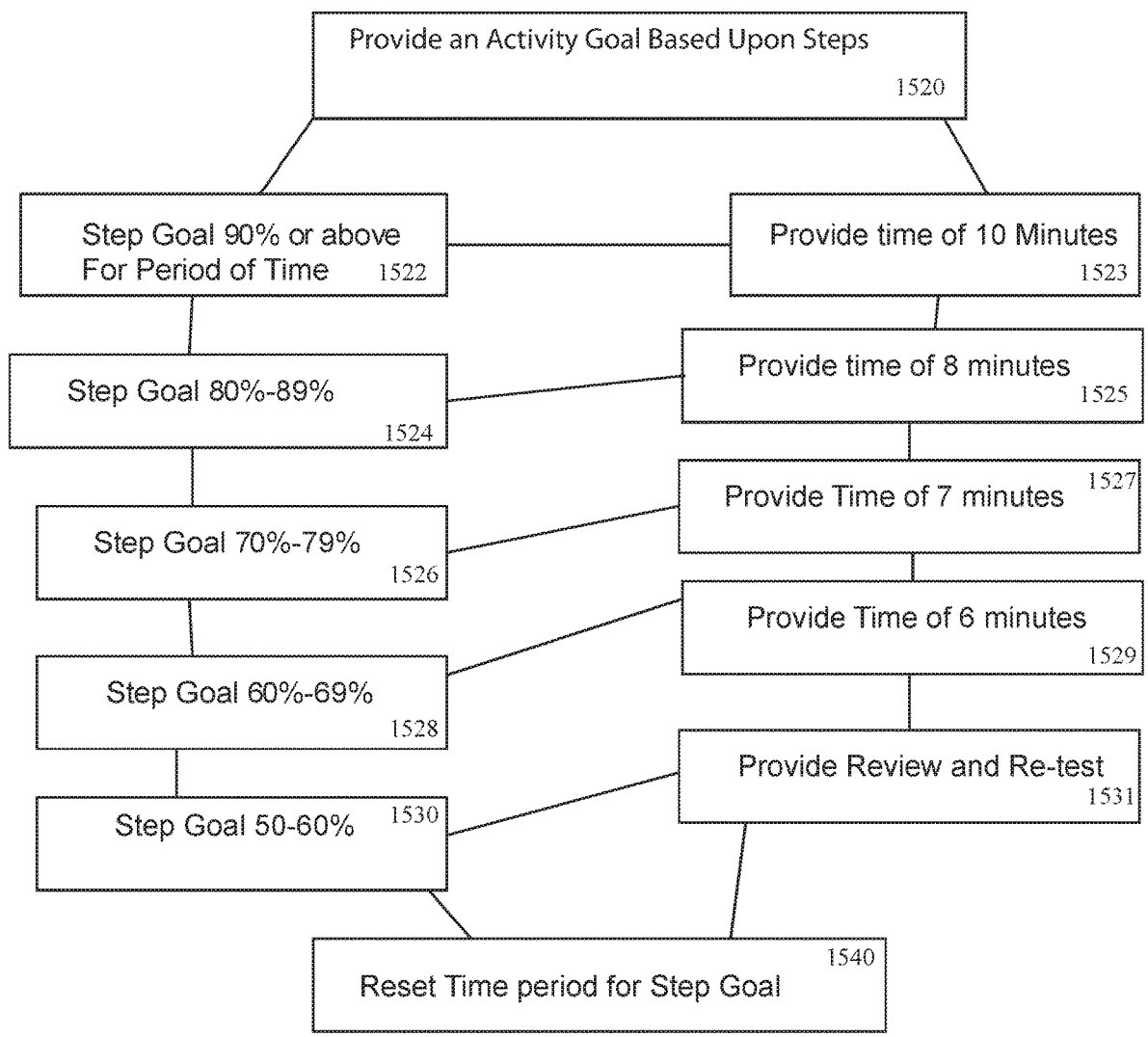
FIG. 15 is an alternative reward system involving movement such as steps.

FIG. 15 shows a process for another means for rewarding a user. For example, there is a first goal of providing an activity goal based upon the number of steps that a user takes in step 1520. Next, in step 1522, if the user achieves their goal of steps or within 90% of their goal, the system will provide the user with a pre-set amount of free time such as 10 minutes of free time in step 1523. Next, in step 1524 if the user achieves between 80-89% of their goal, the system can in step 1525 provide up to eight minutes of free time. Next, in step 1526 if the user only achieves between 70 and 79% of his step goal, the system can reward the user with up to 7 minutes of free time. Next, in step 1528 if the user achieves between 60 and 69% of his goal the system will reward the user with up to 6 minutes of free time in step 1529. Next, in step 1530 if the user achieves his or her step goal of only 50%-60% of the goal then the user is provided with a review and re-test. Next, the system then moves to a reset time for the step goal in step 1540. With this process, the steps can be monitored using a step counter and/or a GPS tracker. The step counter can be based upon movement of the device such as a portable electronic device such as an accelerometer and/or gyroscope 151. There can also be GPS tracking on the device as well to determine the distance covered via GPS. In alternative to awarding time, the user can also be rewarded with points as well.

Figure 16:
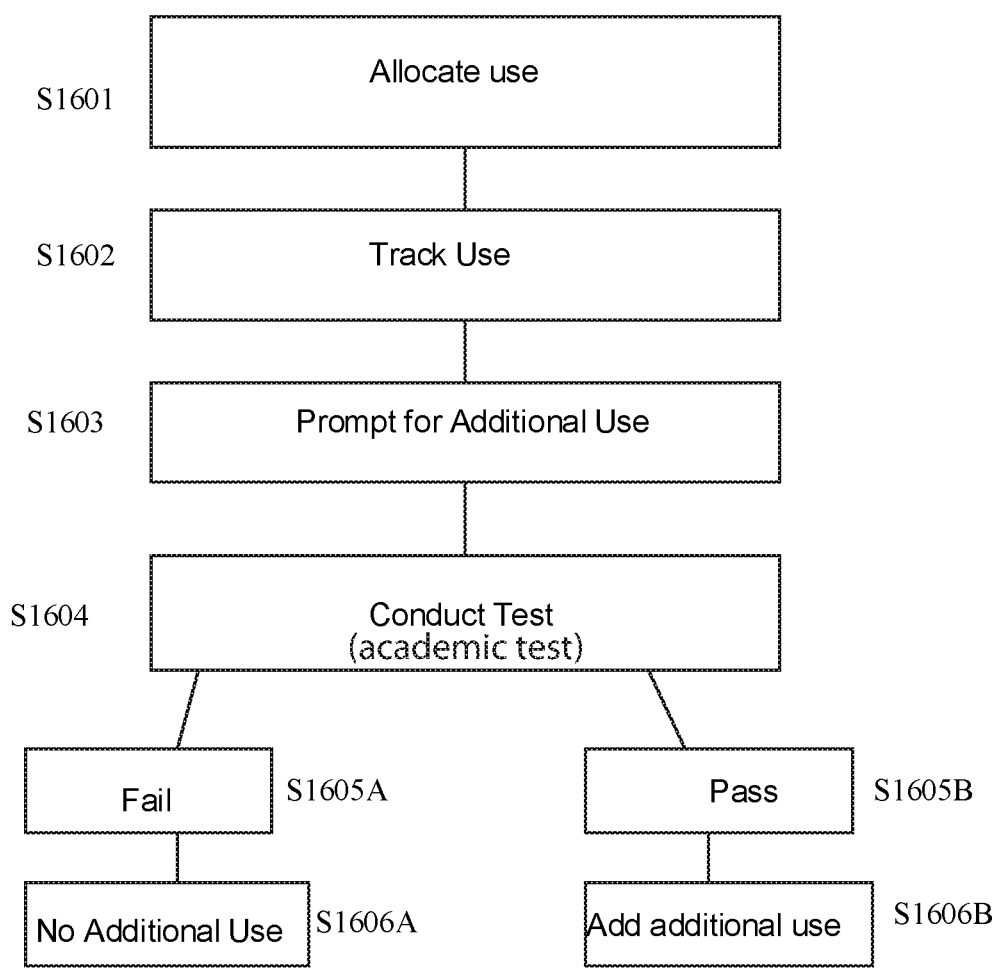
FIG. 16 is a flow chart for the selective metering of use.

In addition to rewarding additional use, the system can also meter use or control the use so that it does not extend for too long. This metering of use can be independent of whether the use achieves a certain level of academic or physical performance. FIG. 16 is a flow chart for the selective metering of use. For example, there is in step S1601 the system can allocate the amount of use that a person or user should receive. Next, in step S1602 the system can track the use that the person receives. Next in step S1603 the user can prompt the system for a request for additional use. Next, in step S1604 the system can issue a test such as an academic test for the user. In step S1605A the system can fail the user if the user does not pass the academic test and then issue no additional use in step S1606A. Alternatively, in step S1605B the system can issue a pass to the user if the user passes the academic test. Then in step S1605B the system can issue additional use.

Figure 17:
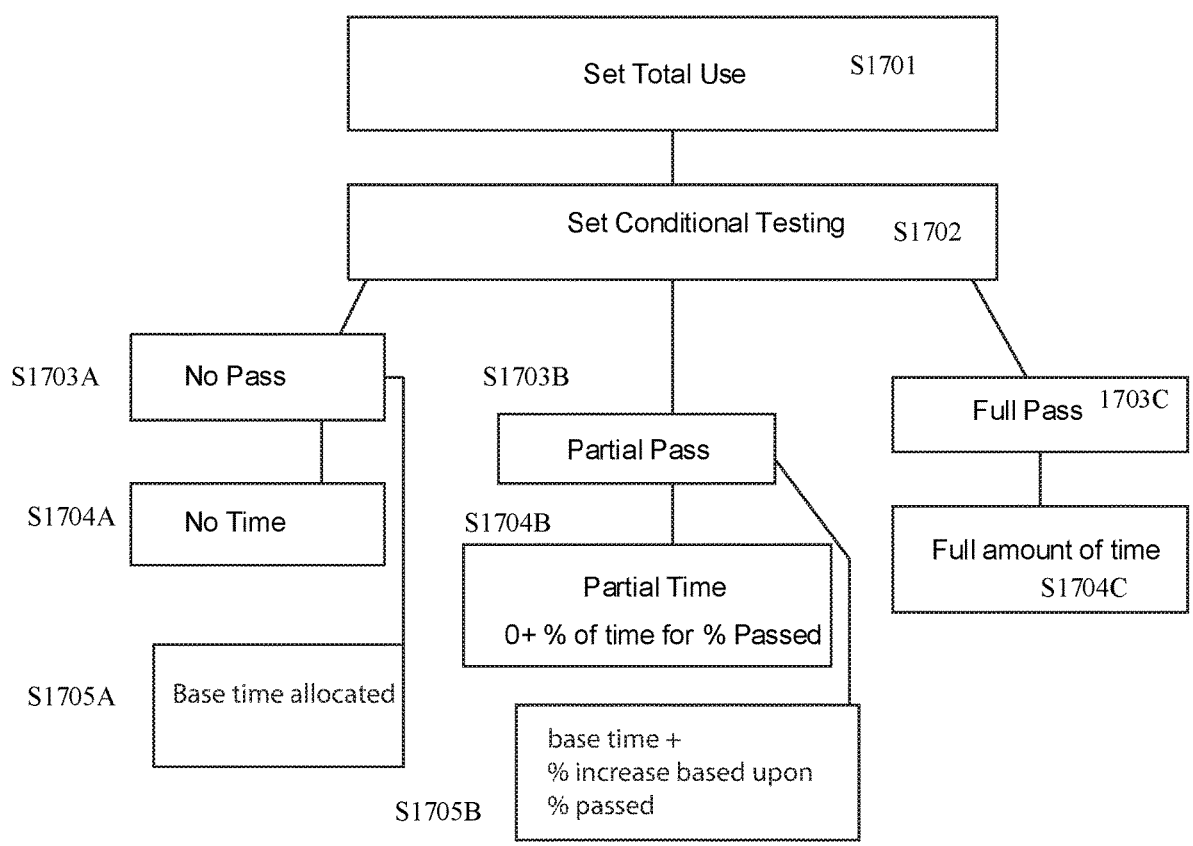
FIG. 17 is a flow chart for conditional testing.

FIG. 17 is a flow chart for conditional testing. In this embodiment, the system can set the total use for the user in step S1701. Next, in step S1702 the system can set conditional testing for the user. With conditional testing the system can present the user with the ability to qualify for use. For example, the system can present a test, if the user does not pass the test in step S1703A the user receives either no time in step 1704a or a base amount of time in step 1705a. Alternatively, if the user achieves a partial pass, in step S1703B then the user can receive partial time in step 1704b based upon the percent of questions or achievements passed. In step 1705B this partial time can be calculated based upon the base time plus the percent in time increase depending on the percent that is passed. Alternatively, if the user achieves a full pass in step 1703C the user would receive a full amount of time in step 1704c.

FIG. 18 is an alternative flow chart for the allocation of points after testing the user such as an academic test or a physical test. These points can be converted later to time used on the electronic device or other benefits that can be used by the user. For example, in steps S1801 the system can set the testing of the user. If in step S1802 the system determines that the user qualifies, then the system can allocate points in step S1803. Alternatively, if the user does not qualify or overqualifies, the system can change the level of testing in step S1801a. Next in step S1804 the system can set forth a formula for conversion of these points based upon the Time/Date/Location of the user. Next in step S1805 the system can convert the points into use or type of use of the device. Next, in step S1806 the system can debit the total number of points for the user.

Figure 19A:
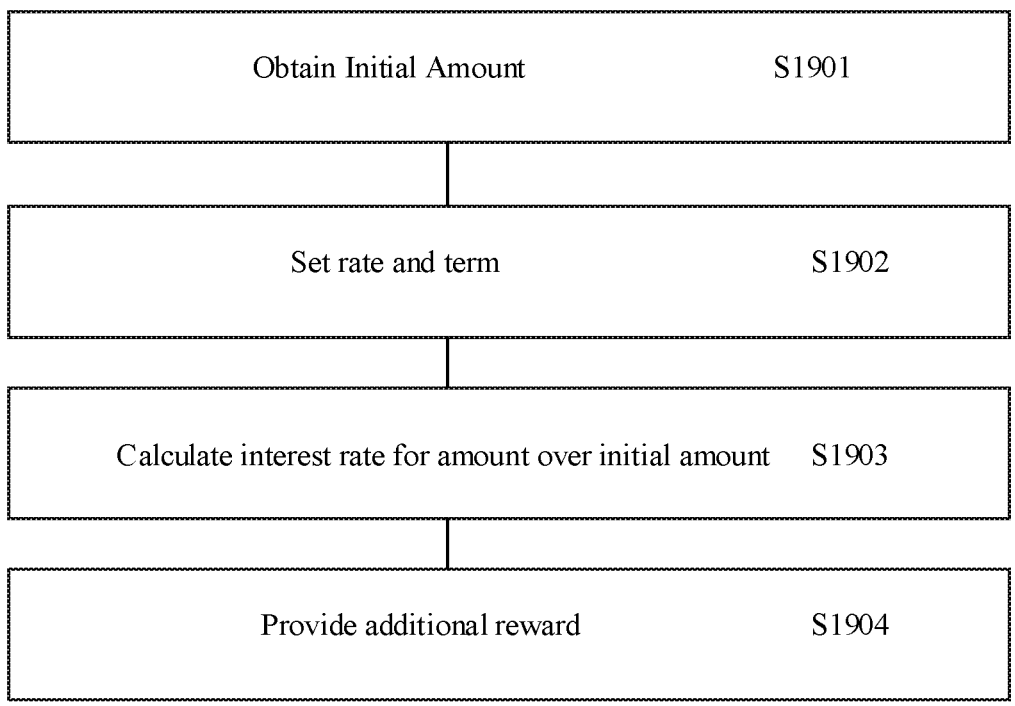
FIG. 19A is a flow chart for the initial allocation of points.

FIG. 19A is a flow chart for the initial allocation of points. This flow chart starts when the user obtains an initial amount. For example, in step S1901 the user can obtain an initial amount from the system. Next, in step S1902, the system can calculate the interest rate for the amount obtained over the initial amount in step S1903. For example, if the base amount was 500 points and the user obtained 600 points, the system can reward the user for maintaining a minimum balance (of 500 points) and also for saving an additional 100 points. The interest paid could be on the additional 100 points to the user. Next, in step S1904 the system could provide an additional reward to the user.

Figure 19B:
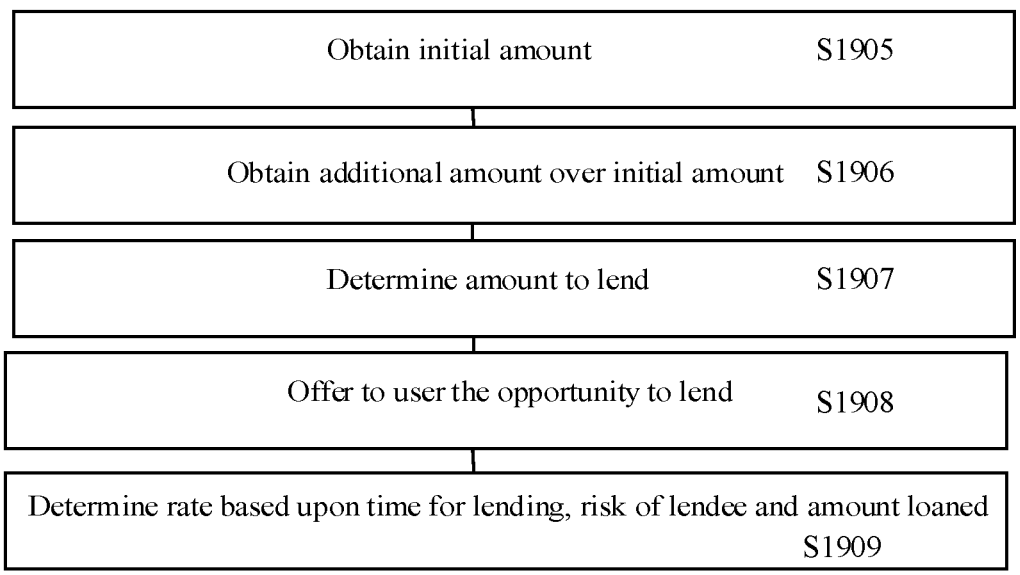
FIG. 19B is an alternative flow chart for the initial allocation of points.

FIG. 19B is an alternative flow chart for the initial allocation of points. For example, the user can obtain an initial amount in step S1905. Next, in step S1906, the user can obtain an additional amount over the initial amount. Next, the user could determine the amount to lend in step S1907 to another user (such as 100 points). The first or initial user (owner of the points) could then lend to the second user these points in step S1908. Next, in step S1909, the system or the user could determine the rate based upon the time to charge for lending, which could be based upon the risk to the lendee, and the amount loaned.

Figure 20A:
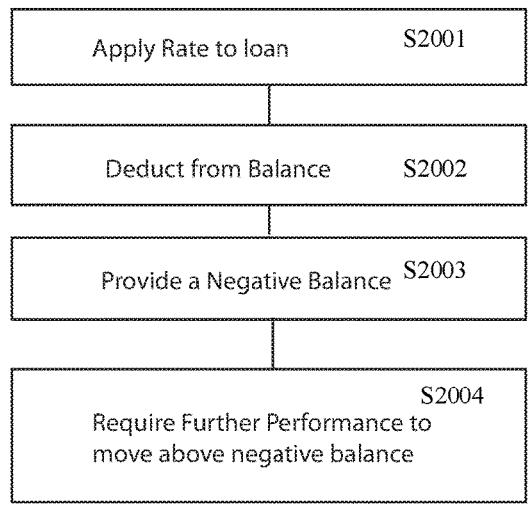
FIG. 20A is a flow chart for applying interest rates to point amounts.

FIG. 20A is a flow chart for applying interest rates to point amounts. For example, in step S2001 once the amount is loaned to another user, either through an automated loan process with the server or through direct lending of time, the system can apply the rate to the loan. Next, in step S2002 the system can automatically deduct the amount of time or points from the balance of the lendee and apply the interest to the lender. Next, in step S2003, if the lendee has balance that falls into a negative category the system can apply a negative balance to the lender in the form of credit to the user. Next, in step S2004 the system can require further performance from the lendee in order to improve the lendee's negative balance in step S2004.

Figure 20B:
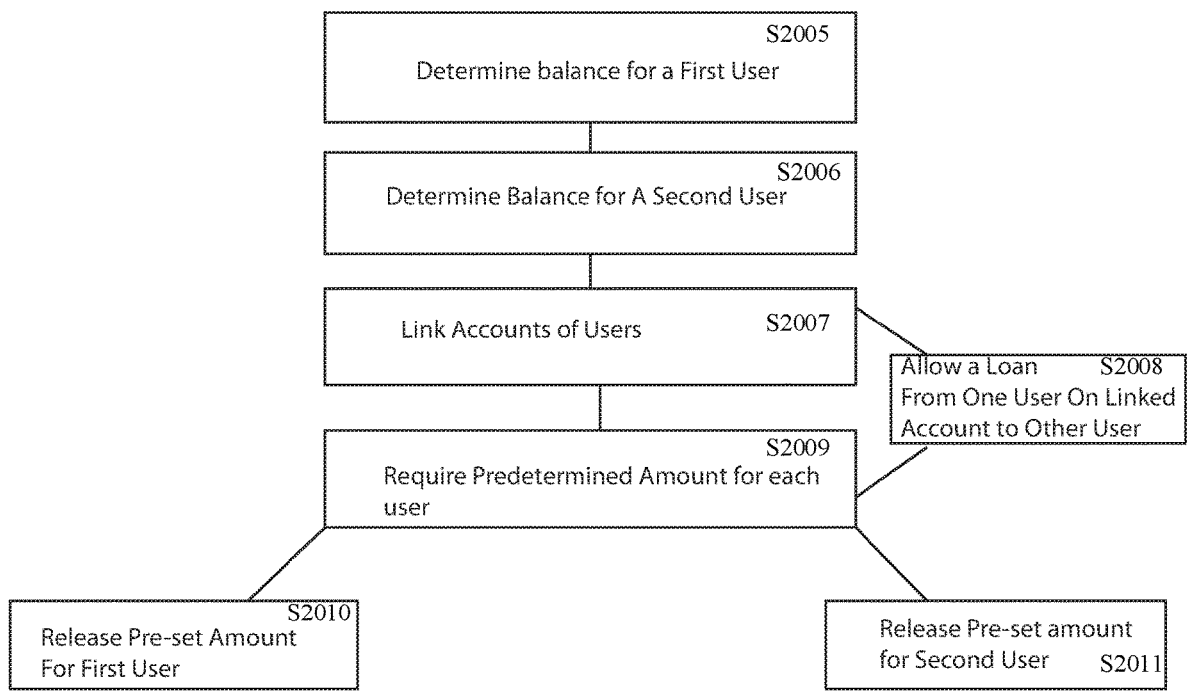
FIG. 20B is a flow chart for applying balances for users with interest rates or loans.

FIG. 20B is a flow chart for showing the relationship that can be established between the lender and the lendee using the system. For example, the system can work to update balances for users with interest rates or loans. For example, in step S2005 the system can determine the balance of a first user. Next in step S2006, the system can determine a balance for a second user as well. Next, in step S2007 the system can link the two accounts of the user. Next, in step S2008 the system can allow a loan from the first user (lender) to the second user (lendee) when these two accounts are linked. In another step S2009, the system can require a predetermined amount to be available for each user. Next, in step S2010 the system can release a pre-set amount for the first user. Alternatively, in step S2011 the system can release a pre-set amount for the second user as well.

Figure 21:
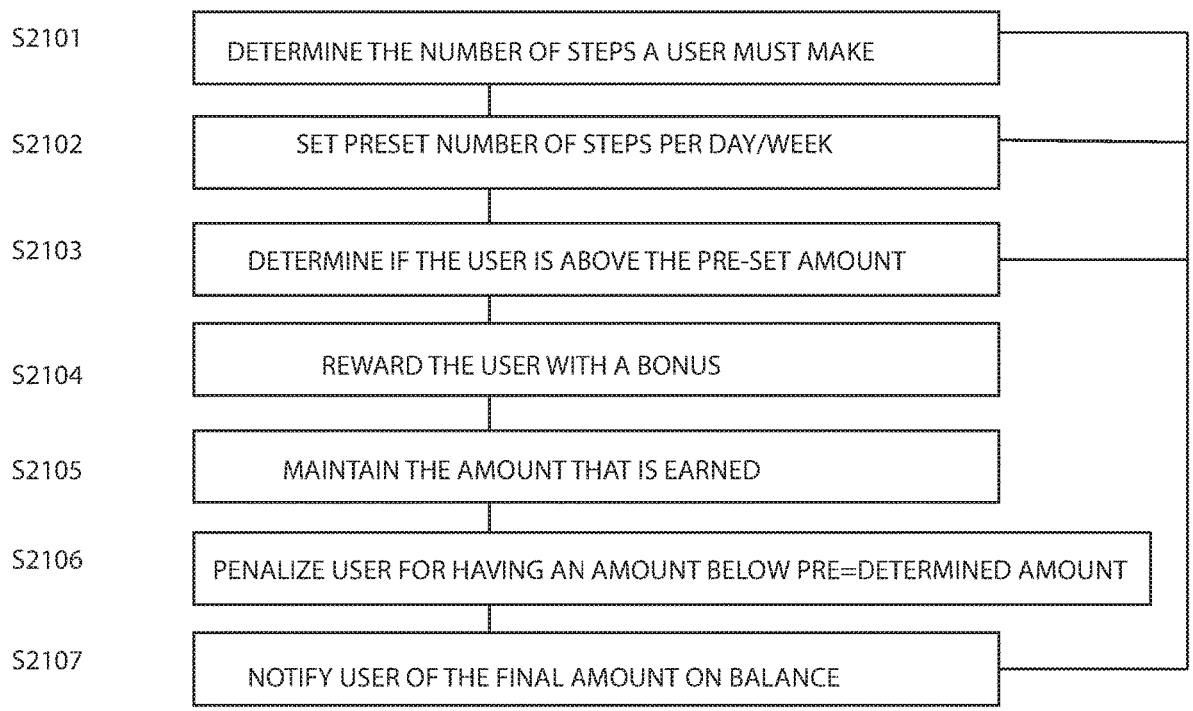
FIG. 21 is a flow chart for setting the amount of exercise a user must obtain to receive points.

FIG. 21 is a flow chart for setting the amount of exercise a user must obtain to receive points. For example, in step S2101 the system can be set up to encourage the user to exercise more using walking or a tracking of steps. For example, in step S2101 the system can determine the number of steps that a user must make. Next, in step S2102 the system can set a pre-set number of steps per day/week for the user. Next, in step S2103 the system can determine whether the user is above the pre-set amount. Next, in step S2104 the system can reward the user with a bonus for obtaining the predetermined amounts. Next, in step S2105 the system can require that the user maintain the amount that is earned in order to receive a bonus. Alternatively, the system can penalize the user for having an amount that is below the pre-determined amount. This can be by either charging interest on the account (deduct time or points) from the account. Next, in step S2107 the system can notify the user of the final amount of the balance on the account.

Figure 22:
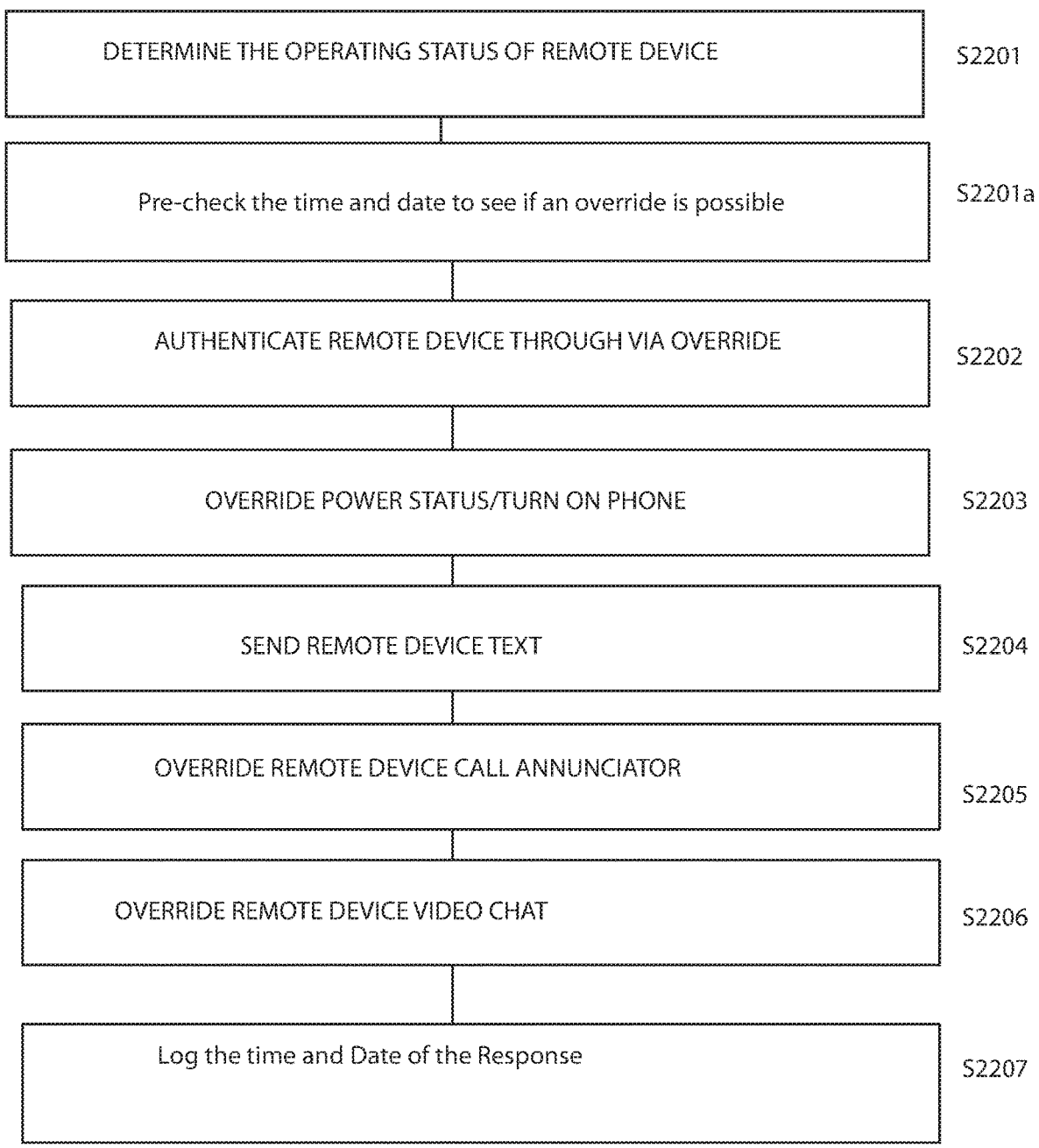
FIG. 22 is a flow chart to override the operating status of a remote device.

FIG. 22 shows another way to remotely control the device. For example, in step S2201 a remote user or administrator can determine the operating status of a remote device. This remote user could be for example a parent, employer, friend or spouse of the user (otherwise an administrator). In step S2201a the system can pre-check the time and date to see if an override is possible. Next, in step S2202 at the user's behest the system can allow the administrator to authenticate the remote device through an override. This would then allow for the remote turn on of a remote device. Next, in step 2203, the system can allow for the override of the power status to turn on the remote device. This could be from a remote turn on component 147a (See FIG. 2a having a battery 147b) in the remote device. Next, in step S2204 the user/administrator could send the remote device a text or place a telephone call in step 2205. Alternatively the user/administrator could override the remote device by placing a video chat in step S2206. Next, in step S2207, the system can be configured to log the time and date of the response so as to determine whether the user who is receiving the override has responded sufficiently to the request.

Figure 23:
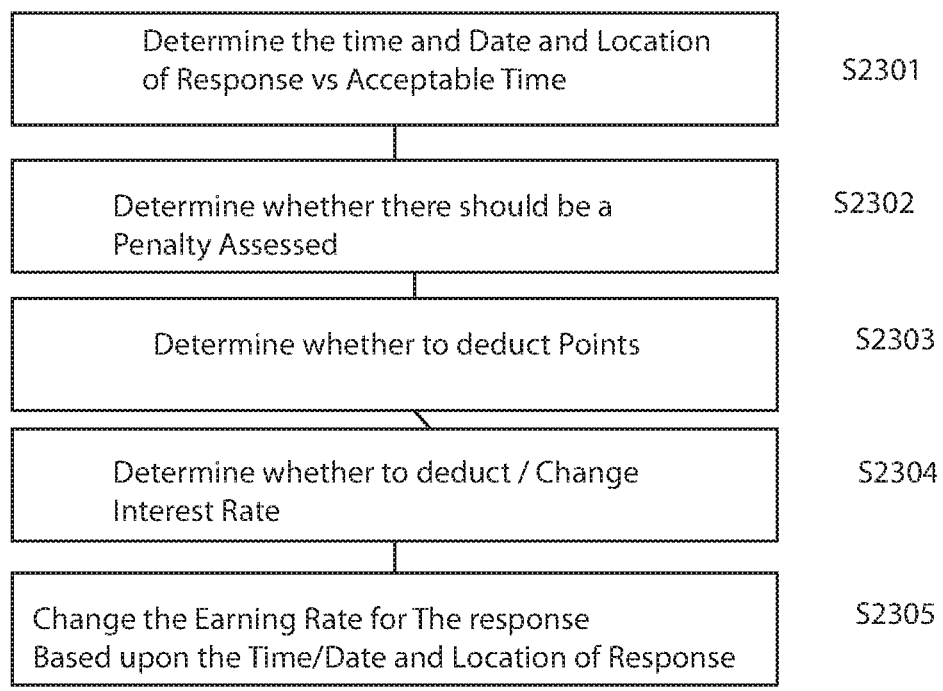
FIG. 23 is a process for determining the points to be awarded for responding to the override of the existing applications.

In FIG. 23 the system can also be configured to determine based upon the time, date and location of the response in step S2207, whether the responding user who has received the override has responded in an acceptable time. For example, in step S2301, the system can determine whether the user who received the override has responded within the sufficient pre-set time, date and location and within a pre-set amount of time. Next, in step S2302, the system can determine whether there should be a penalty assessed to this user for any delay of response or non-response. Next, in step S2303 the system can determine whether to deduct points from the user's account. Next, in step S2304 the system can determine whether to deduct or change the interest rate that is charged to the user depending upon the time, date and location of the interrupted user's response.

Next, in step S2305 the system can also change the earning rate for the response based upon the time, date and location of the user responding to the override.

Thus, if for example, a parent is urgently trying to contact their child and wants to override their child's phone or electronic device. If the child is located in a school setting during school hours, the system would not pursue an override in step S2201a because the student could get into trouble with the school regarding that school's cell phone policy. Therefore, the system could refuse to allow the parent to override the student's setting when the student's electronic device is located in a school during school hours. However if the student is located at a friend's house or at a park and the student should allow the override through, and the student does not respond to the parent, then the process can proceed to determine whether the student should be penalized (See FIG. 23) for not responding to his or her parent.

Figure 24:
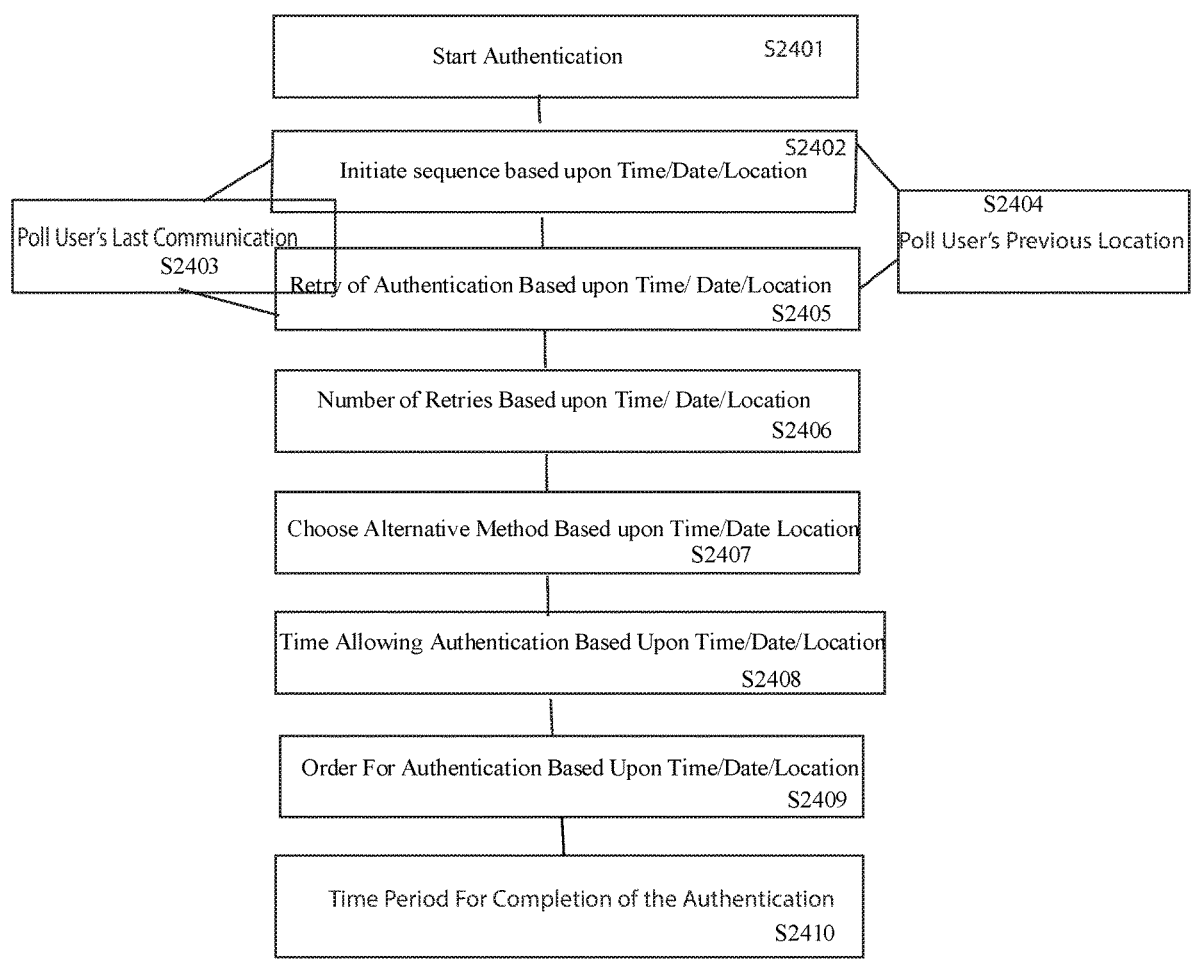
FIG. 24 is a flow chart for another process for authentication.

FIG. 24 is a flow chart for another process for authentication. With this process, there is a first step S2401 wherein the user can start his or her authentication. next, in step S2402 the user can initiate a login sequence based upon the time/date/and location of the user. For example, depending on a particular time, a particular date and a particular location these facts can trigger a specific login sequence that is to be used. In addition, these facts can also trigger the number of retries that a person can have as well. For example, if the person was attempting to login from their known home location during usual login hours, the system could offer a particular login sequence and a larger number of login reattempts for the user than if the user was not in their home location. Thus, the system would set in step 2406 the number of login reattempts that a user could take. Furthermore, the number of retries or the sequence for logging in in step S2402 can be changed when the system polls the last communication made by the user, or poll the user's previous location in step S2404. Next, depending on the time/date/and location of the user, the user could choose alternative methods to login in step S2407. Thus if the location was different than the initial location, then the login sequence could be different or the number of retries would be different as well.

Next, in step S2408 the time allowing authentication would be set. This includes the time of day that the use could login to the system. Next in step S2409 the order for the authentication could be changed based on the time/date/and location. For example, if the user changed his or her location then the order for different steps for authentication could be changed. For example, if the user first logged in using a pin, then a passcode then separate hardware authentication, the order could be changed to logging in with a password, then a pin, then hardware authentication depending on the changes of the time of day, the date or location of the user. Next, in step S2410 the time period for completion of the authentication could be set based upon the initial time/date/ and location of the user.

Figure 25:
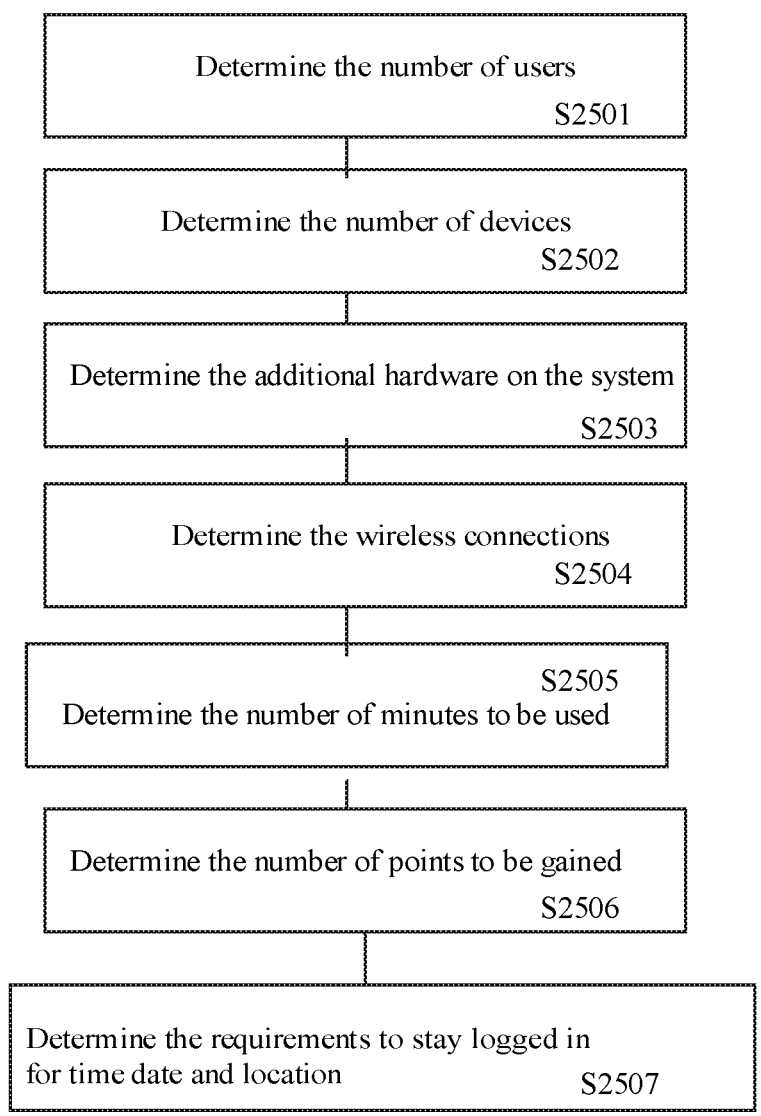
FIG. 25 is a flow chart for another process for authentication.

FIG. 25 is a view of another means for determining the proper authentication of a user. For example in step S2501 the system can determine the number of users to login. Next, in step S2502 the system could determine the number of devices to login. Next, in step s2503 the system could determine the additional hardware to add to the system or to have this additional hardware login. Next, in step S2504 the system could determine the wireless connections for all of the different pieces of hardware to login into the system. Next, once the user is logged in, the system could determine for each of the devices the number of minutes that the user could use while logged in in step S2505. Next, in step S2506, the system could determine the number of points to be gained as well. Next, in step S2507 the system could determine the requirements to stay logged in based upon the user's time/date/and location.

Figure 26:
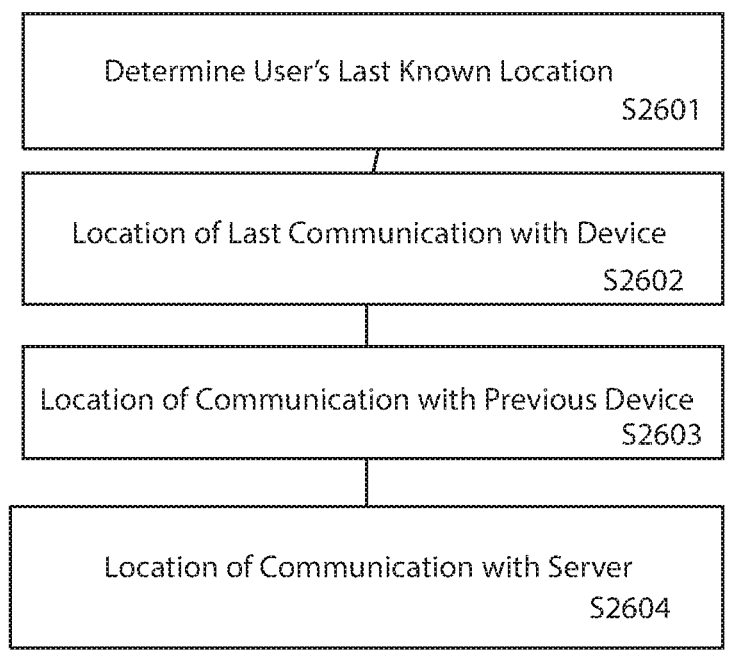
FIG. 26 is a flow chart of some steps shown in FIG. 24.

FIG. 26 is another flow chart for use with the steps shown in FIG. 24, particularly steps S2404 and S2403. For example, in step S2601 the system can poll the user's last known location. Next, in step S2602, the system can determine the location of the last communication with the device. Next, in step S2603 the system can determine the last communication with a previous (non server) device. Next, in step S2604 the system can determine the location of the last communication with the server as well.

FIG. 27 is a flow chart for the process for determining how to login using hardware as well as location of previous login as well as external hardware devices. For example, the process starts with step S2701 wherein the system determines the time/date/and location of the user. Next, in step S2702 the user logs into another hardware device (See FIG. 28A hardware 2802). Next, the user in step S2703 logs into the second hardware device (See FIG. 28A hardware 2803). Next, in step S2704 the system determines the location of the previous login. Next in step S2705 the system determines the previous location of the communication. Next in step S2706 the user logs into the server.

Figure 28A:
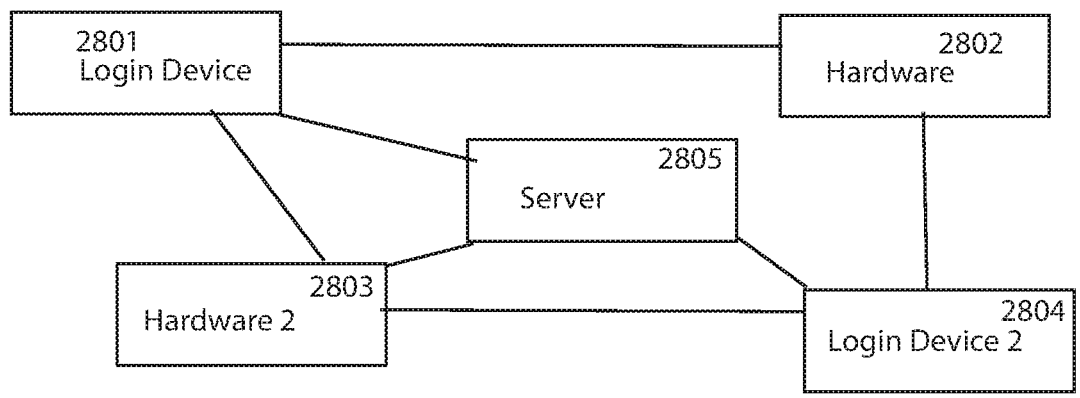
FIG. 28A is a layout of a system for logging into a server.

FIG. 28A shows the layout of the devices that are in communication with each other and the location of each device as well. For example, there is shown a login device 2801 which the user uses to login to a server. In addition, there is hardware 2802 which the user logs into as well as a second hardware device 2803. Thus, the user with login device 2801 logs into server 2805 by first logging into these two different peripheral hardware devices 2802, and 2803. Furthermore, there is a second login device 2804 that can login using the same type of protocol, logging into the external hardware devices 2802 and 2803 and then logging into server 2805.

Figure 28B:
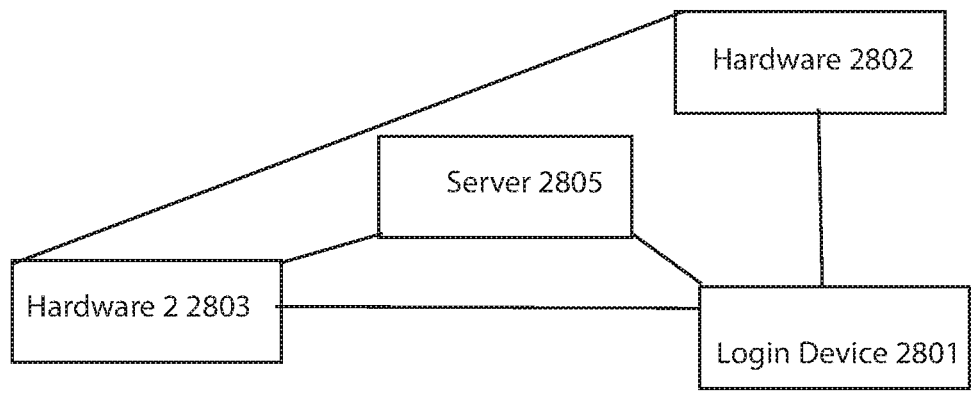
FIG. 28B is a layout of another system for logging into a server.

FIG. 28B shows a second layout of a second location wherein there is a first peripheral hardware device 2802, and a second peripheral hardware device 2803 as well as a primary login device 2801. With this design, in this location there is a different structure for logging in because it is in a different location. With this location, the system (particularly server 2805) can use the location of communications with other peripheral hardware such as hardware 2802 and 2803 as well as communication with other login devices as a means for scheduling a type of login as shown in FIG. 27.

Figure 29:
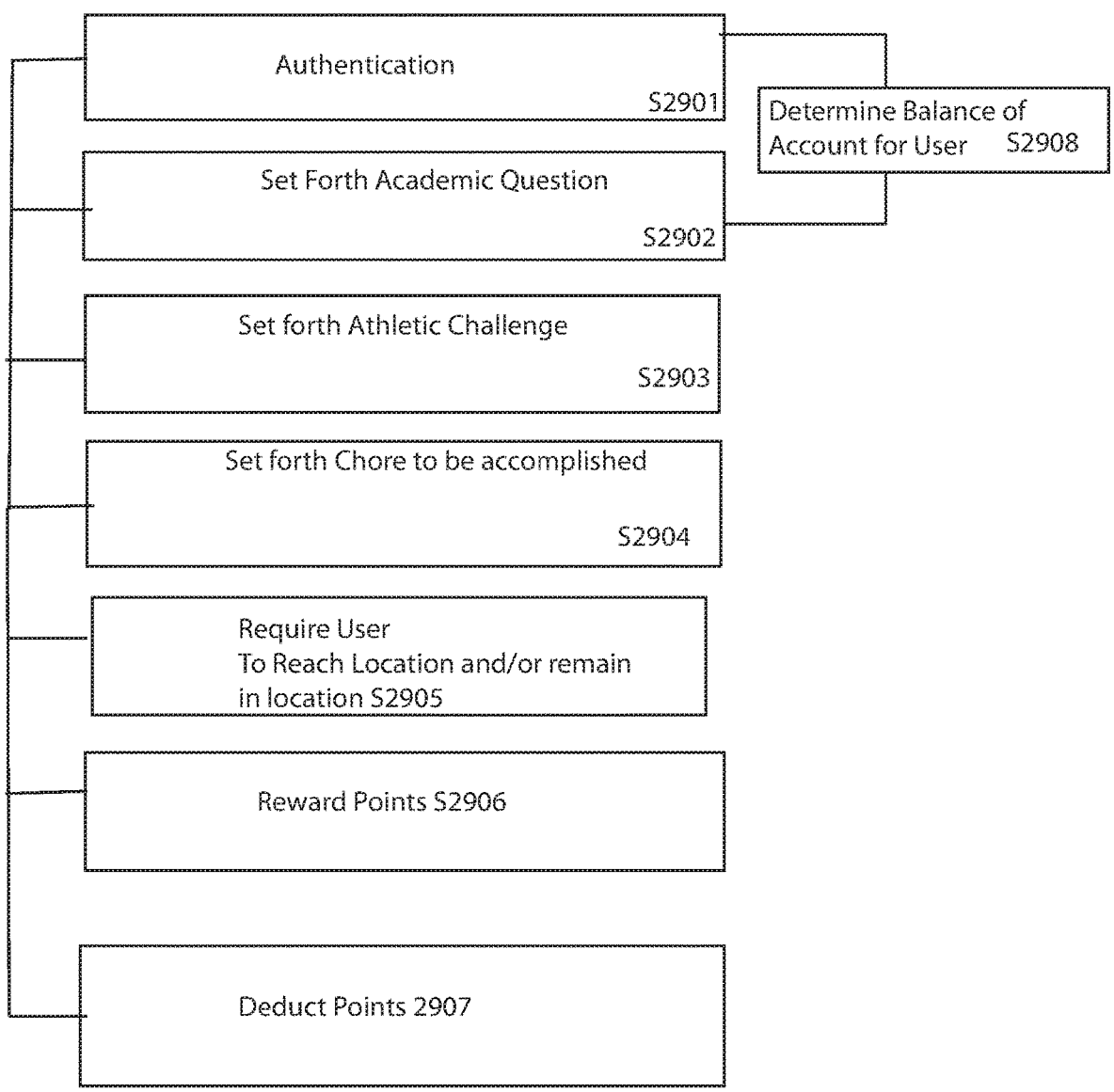
FIG. 29 is an integration of multiple different systems shown herein.

FIG. 29 shows that once the user has been authenticated by any one of the above processes (step 2901 is a place holder step for each and every login or authentication process shown above). Thus any one of the login or authentication steps shown above can be used in this process. Next, the system can allow the user to earn points via various different challenges such as via answering an academic question in step S2902 (See FIGS. 11-12), or an athletic challenge in step 2903 (See above FIG. 14), or a chore or other type of activity (See FIG. 15) in step S2904.

Next, in step S2905 the system can require that the user reach a certain location and/or remain in that location. For example, this requirement as well as any one of the other requirements in steps S2902, S2903, S2904 can be mixed and matched to require the user to perform particular tasks in anticipation of earning points. Depending on the level of performance in each and every one of these activities the system can either reward points in step S2906, or deduct points in step S2907.

However, the system can determine the balance of account of the user in step S2908 so that with respect to the user having a pre-set amount of balance on their account, the system could require that the user perform a pre-set amount of steps such as any one of the steps outlined in steps S2902-S2905 so that the user can achieve a sufficient amount of point total to allow them to use the electronic device. If the user had a high negative balance (very negative balance), the user would be required to perform more tasks. However, if the user had a high positive balance then the system may require fewer tasks to be performed.

Accordingly, while at least one embodiment of the present invention have been shown and described, it is to be understood that many changes and modifications may be made thereunto without departing from the spirit and scope of the invention as defined in the appended claims.

What is claimed is:

1. A process for authenticating a user into a system comprising the steps of:
   identifying a primary login device;
   determining the time of login;
   determining the location of the login;
   determining the date of the login;
   determining whether the primary login device is in communication with another external hardware device;
   setting a protocol for logging into the system based upon the time of login, the date of login and the location of the login as well as the type of external device that the primary device is in communication with;
   setting forth at least one test for a user to pass once the user is logged into the system
   rewarding points to the user once the user has passed the test;
   having the user lend points to another user after the user has passed the test;
   rewarding interest points to a user after the user has loaned points; and
   deducting points from the user who borrowed points.

2. The process as in claim 1, further comprising a step of awarding points to the user based upon any one of the time, or date or location of the user at login.

3. The process as in claim 1, further comprising a step of deducting points from the user based upon any one of the time or date or location of the user.

4. The process as in claim 1 further comprising a step of presenting an academic question for answering before authenticating the user into the system.

5. The process as in claim 4, further comprising the step of presenting an athletic goal for a user once the user is authenticated into the system.

6. The process as in claim 1, further comprising the step of presenting an athletic goal for a user once the user is authenticated into the system.

7. The process as in claim 6, wherein the athletic goal is based upon the user attaining a pre-set heart rate for a predetermined period of time.

8. The process as in claim 7, wherein the pre-set heart rate is within 90% of the user's predetermined maximum heart rate.

9. The process as in claim 8, further comprising the step of rewarding points to a user provided that they maintain a heart rate above a predetermined heart rate for a predetermined period of time.

10. The process as in claim 1, further comprising the steps of:
    requiring the user to perform a chore once the user is logged into the system;
    rewarding points to the user once the user has performed the chore.

* * * * *